United States Patent [19]

Bernstein et al.

[11] Patent Number: 5,282,202
[45] Date of Patent: * Jan. 25, 1994

[54] COMPOSITE FRAME RECONFIGURATION IN INTEGRATED SERVICES NETWORKS

[75] Inventors: Simon Bernstein, Reston, Va.; Mark Jurkevich, Burtonsville, Md.

[73] Assignee: Sprint International Communications Corp., Reston, Va.

[*] Notice: The portion of the term of this patent subsequent to Nov. 17, 2009 has been disclaimed.

[21] Appl. No.: 676,537

[22] Filed: Mar. 28, 1991

[51] Int. Cl.⁵ ............................................. H04J 3/24
[52] U.S. Cl. ................................................. 370/94.1
[58] Field of Search ..................... 370/94.1, 85.6, 60, 370/110.1, 85.7; 340/825.5, 825.51

[56] References Cited

U.S. PATENT DOCUMENTS

| | | | |
|---|---|---|---|
| 4,679,191 | 7/1987 | Nelson et al. | 370/118 |
| 4,701,907 | 10/1987 | Collins | 370/85.15 |
| 5,121,384 | 6/1992 | Ozeki et al. | 370/60 |
| 5,142,532 | 8/1992 | Adams | 370/94.1 |

*Primary Examiner*—Douglas W. Olms
*Assistant Examiner*—Shick Hom
*Attorney, Agent, or Firm*—Wigman, Cohen, Leitner & Myers

[57] ABSTRACT

Method and apparatus for information communication during call connections between subscribers adapted to transmit and receive multimedia information at a pair of endpoint nodes of a fast packet switched network, the endpoint nodes being connected by a network path including at least one transit node traversed by links of the path. The multimedia information is conveyed as traffic consisting of a plurality of component types from among voice, video and data traffic component types each associated with a different subscriber at one of the endpoint nodes. A succession of composite frames conveying information is launched from each of the endpoint nodes to the other of the pair on the network path, with each of the frames configured to contain a plurality of fixed size channels representing bandwidth allocations for each of the traffic component types. Each channel is assigned to a subscriber of the respective traffic component type at the endpoint node from which the composite frame wa launched for the duration of that subscriber's respective call connection. The composite frames are dynamically reconfigured by releasing and reassigning channels at each of the endpoint nodes when necessary to accommodate changes in traffic flow in the network.

20 Claims, 10 Drawing Sheets

FIG. 1
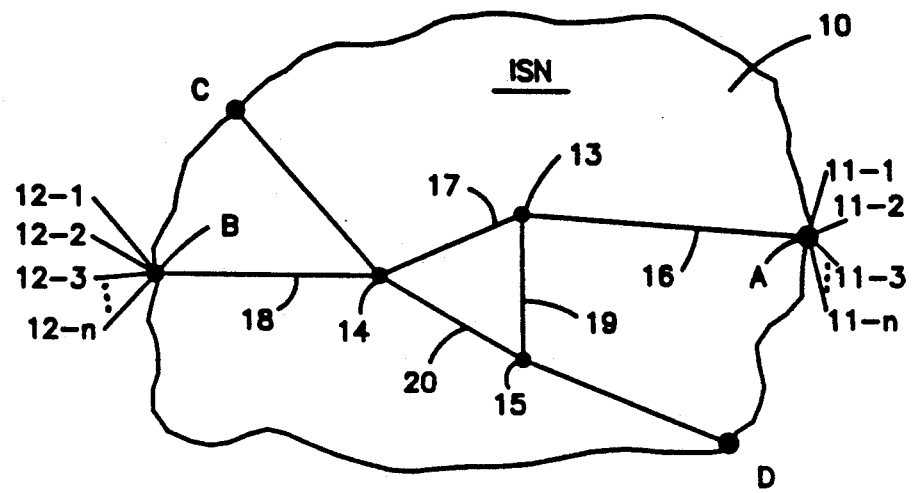
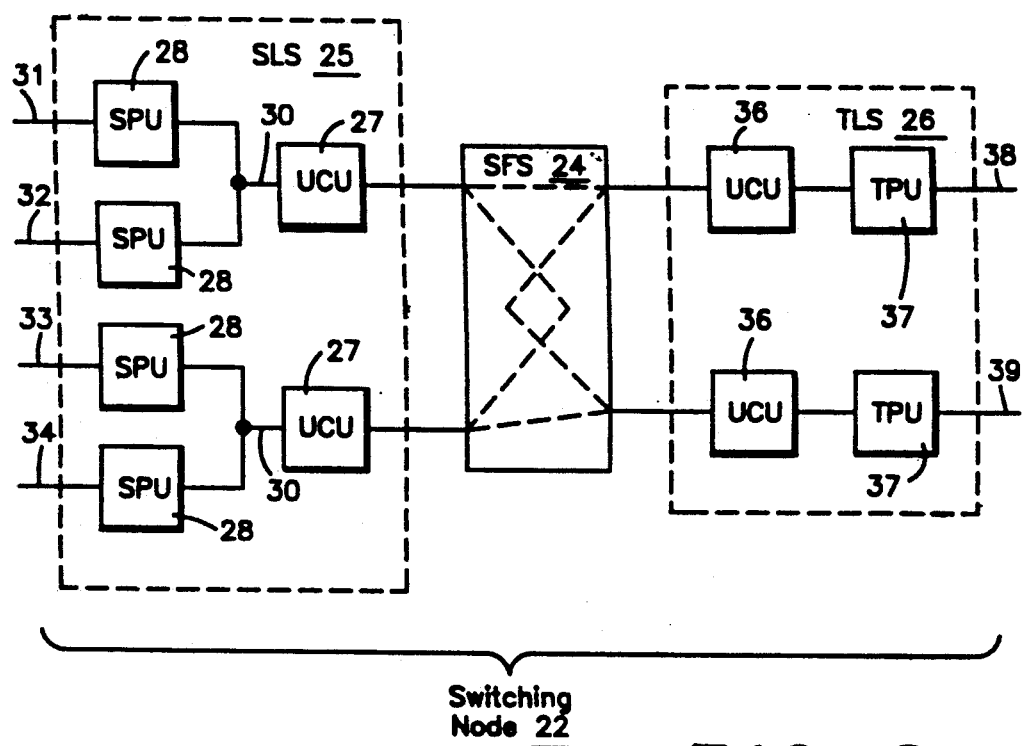
FIG. 2

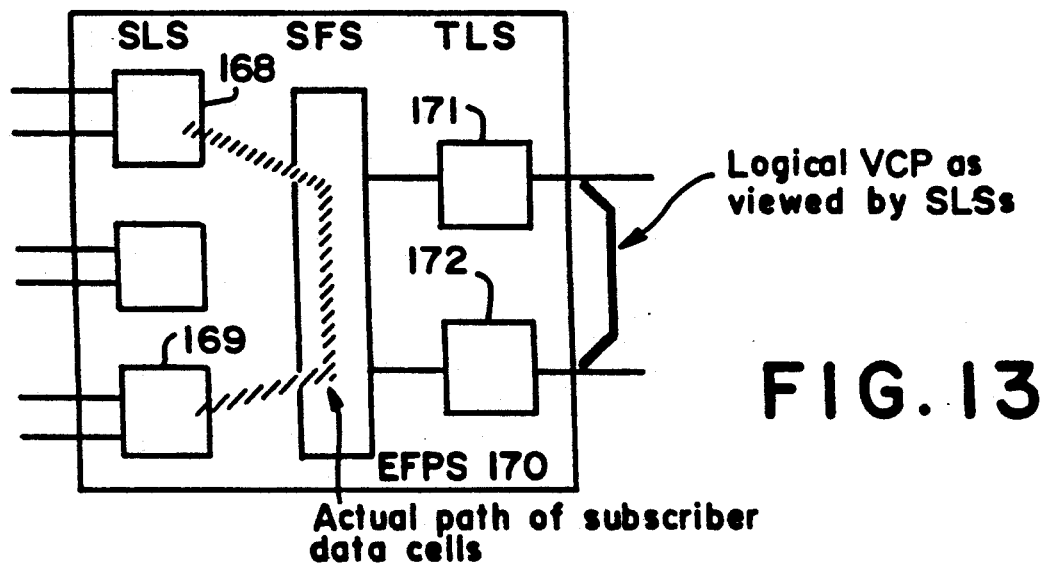
FIG. 13
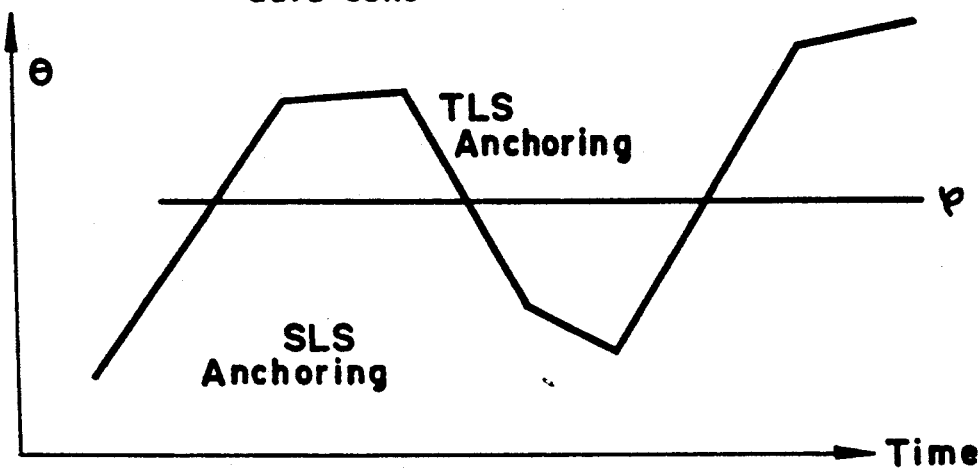
FIG. 14
| # | Link/T-Slot Profile | | | A-bit |
|---|---|---|---|---|
|   | α | β | γ |   |
| 1 | 1 | 1 | 1 | 1 |
| 2 | 1 | 1 | 0 | 0 |
| 3 | 1 | 0 | 1 | 1 |
| 4 | 1 | 0 | 0 | 1 |
| 5 | 0 | 1 | 1 | 1 |
| 6 | 0 | 1 | 0 | 0 |
| 7 | 0 | 0 | 1 | 0 |
| 8 | 0 | 0 | 0 | 0 |
FIG. 18

COMPOSITE FRAME RECONFIGURATION IN INTEGRATED SERVICES NETWORKS

CROSS REFERENCE TO RELATED APPLICATIONS

This application is related to copending U.S. patent applications filed in the names of M. Jurkevich and S. Bernstein on even date herewith, and assigned to the same assignee as the instant application, as follows:
"Configurable Composite Data Frame", Ser. No. 07/676,524;
"Composite Frame Compression in Integrated Services Networks", Ser. No. 07/676,535;
"Bandwidth Seizing in Integrated Services Networks", Ser. No. 07/676,539, now U.S. Pat. No. 5,164,938;
"Adaptive VCP Control in Integrated Services Networks", Ser. No. 07/676,540;
"Prioritizing Attributes in Integrated Services Networks", Ser. No. 07/676,515; and
"Fixed Interval Composite Framing in Integrated Services Networks", Ser. No. 07/676,536.

BACKGROUND OF THE INVENTION

The present invention relates generally to packet switched digital telecommunication networks, and more particularly to improvements in fully integrated voice, data, and video (multimedia) communication services through the shared use of transmission and switching facilities in an integrated services network, including but not limited to networks such as those defined by the CCITT ISDN (Integrated Services Digital Network) and Broadband ISDN (B-ISDN) standards. The present invention provides for the coexistence and integration of 1.2 kilobits per second (kbps) to 2.045 megabits per second (mbps) applications with B-ISDN (>2.048 mbps) applications in a true multimedia network.

In recent years, the International Telegraph and Telephone Consultative Committee (CCITT), a telecommunications industry international standards-setting group, established Study Group 18 to undertake cooperative planning of B-ISDNs. A principal aspect of B-ISDN is the support it would offer to multimedia traffic applications, in which a multiplicity of traffic component types including voice, data, and video are to be communicated through the network. Each traffic component type exhibits significantly different characteristics or attributes from the others, and may have different characteristics among the members of its own type or class. For example, pure data traffic components may be interactive data, local file transfer data, facsimile data, and so forth, which have different burst sizes, or "burstiness". Such different attributes create differences in the requirements imposed on the network and local equipment for efficient and effective handling of the traffic component types in the communication between sources and destinations of the traffic. For instance, isolated loss of voice packets may be tolerated in telephone communications because the listener can comprehend the overall tenor of the conversation despite these slight gaps. Although quality suffers, the "human ear" is quite forgiving in these circumstances. Delays between different voice packets, i.e., a change in the sequence of the packets from source to destination, however, is unacceptable. In contrast, transmission of data such as X.25 packets may not be adversely affected by delay among packets in transmission, but the loss of individual packets can prevent restoration of an entire message.

In 1988, CCITT Study Group 18 approved recommendation I.121 which identified Asynchronous Transfer Mode (ATM) as the target solution for implementing B-ISDNs. ATM is an asynchronous time division multiplexing technique employing fast packet switching which communicates user information through the network in fixed length packets (called "cells" in the ATM jargon) of 53 bytes each. One mission of the Study Group and its Working Party 8 has been to standardize B-ISDN user network interfaces, including one at 155 mbps and another at 600 mbps. The present focus of the industry, however, is on fast packet (broadband) switching products at 1.54 to 45 mbps. For multimedia networks, the ATM scheme advanced by Study Group 18 uses fixed size cells each of which is assigned to a single user or traffic component type. Depending on user requirements at a given time, considerable bandwidth may be unused because partially empty channels are being transmitted.

In U.S. Pat. No. 4,980,886 titled "Communication System Utilizing Dynamically Slotted Information" (the "'886 Patent"), assigned to the same assignee as the present application, S. Bernstein discloses a multimedia system in which each packet or frame has the same payload size, with a fixed number of slots assigned to users, and in which the slot assignments may be changed periodically to improve communication performance. These are composite frames, packing several users/traffic component types into each frame, rather than only one user per frame.

The invention disclosed in the '886 Patent departs from prior burst switching technology by distributing user payloads among the available slots in a multimedia frame based on the specified bandwidth requirements of each user. The slots, which constitute portions of the available bandwidth for each frame, are not necessarily occupied by respective users from start to finish of a transmission. Instead, each user is guaranteed a certain minimum amount of bandwidth and all users contend for any unused bandwidth in each frame, according to their individual needs. The sending side packet switch allocates bandwidth on a frame-by-frame basis, so that users may be moved from one slot to another or to several slots in midtransmission (i.e., on a "per burst" basis).

In the invention of the '886 Patent, unused bandwidth is not locked out; if a particular user has nothing to send or is not using its minimum guaranteed bandwidth (total slot or slots), the respective slot or portion thereof is allocated to a user having need for it. As the circumstances change, the allocations change. The receiving side packet switch monitors the slots in each incoming frame to keep track of the arriving information (data, voice, video, and so forth) and its sources, and to dispatch the information to its proper destination. Thus, the invention of the '886 Patent provides an entirely controllable bandwidth in which users are assigned priority rights to particular slots, but, depending on each user's particular need for bandwidth, bursts or blocks of information are temporarily allocated to unused slots or unused space in slots on a frame-by-frame basis.

SUMMARY OF THE INVENTION

The present invention also utilizes a composite frame approach for fast packet multimedia or integrated services networks, but instead of users contending for bandwidth in each frame as in the invention of the '886 Patent, bandwidth is conserved and efficiently utilized in a different way—namely, through techniques of frame compression and bandwidth seizing. The concepts of bandwidth contention within a frame as disclosed in the '886 Patent, and frame compression as disclosed in this application and its related applications, are based in part on the relatively recent concept of packet switching using fixed sizes. For example, older packet switching techniques such as X.25 use variable size packets. The ATM scheme employs fixed size cells (with its disadvantages), but is of only recent vintage. The present invention utilizes variable size packets or frames having fixed size channels, and a scheme by which frames may be compressed to conserve bandwidth rather than employing techniques of contention for the available bandwidth.

The terminology "composite data frame" or "composite frame" as used herein refers to frames or packets which are composed of multimedia information components, that is, different traffic component types assembled into a single frame for transmission between subscribers through the network, and which may utilize techniques of frame compression and bandwidth seizing according to the invention. Within that terminology it will be understood that the term "data" is used in a broad sense, encompassing all traffic component types rather than being restricted to pure data only, although in other instances herein the terminology "data" will be used in the narrower sense.

It is a principal object of the present invention to provide an improved method for multimedia frame configuration and transmission in integrated services networks (ISNs), including those of the ISDN type.

It is another broad object of the present invention to provide improved techniques for configuring the payload and control information of a multimedia composite frame for communication between subscribers in an integrated services network.

According to an important aspect of the present invention, all of the various traffic component types in the data streams from multiple subscribers are assembled into composite frames configured for transmission to other subscribers through the integrated services network in such a way as to provide optimum network utilization with minimum cost, and at the same time to satisfy the individual performance requirements of each of the particular traffic component types. The various subscriber data streams are combined by traffic component type at the entry point to the network, if destined for the same exit point. At the exit point, the individual traffic component types are dispersed in separate directions according to their predetermined destinations.

Each traffic component type, whether voice, video, low speed data, high speed data or otherwise, possesses different characteristics or attributes, such as length of burst, ability to tolerate delay, and so forth. The network itself also has different characteristics or attributes, such as the inherent tendency to introduce transmission delay, which impacts on the attribute of each of the various traffic components' capacity to tolerate delay. Another inherent or intrinsic network attribute is the tendency to cause data loss depending on the nature of the traffic in the network. The extent of data loss that a traffic component can suffer and still allow the network to provide adequate service also varies from traffic component to traffic component. The phenomenon that different components of traffic in an integrated services network are affected differently by transmission characteristics of the network is, in and of itself, well known. Proposals in the prior art to solve this problem, however, have proved inadequate.

The present invention, in part, is effective to decouple the traffic component attributes and the network attributes and provide priorities for individual network attributes on a traffic component basis. The principles employed, in which all network attributes are controllable entities on a per-traffic component basis, are to be contrasted with specialized network approaches employed in present day telecommunications systems, in which a single priority level scheme applies for all network attributes. The latter are truly effective where there is only one traffic component and only one or relatively few network attributes which apply to that component, such as in an X.25 data network or a pure voice network. The present invention includes assigning of priorities so that, for example, voice traffic may be allowed to suffer data loss but no delays, while data packets such as X.25 are permitted to suffer delay but no data loss. Such conflicting requirements are resolved in one aspect by assigning traffic component types to separate frames according to their respective sensitivities and tolerances, while satisfying the need for rapid transmission and increased throughput performance in the network.

It is therefore another object of the present invention to provide systems and methods in an integrated services network by which the transmission and throughput performance of various traffic component types is enhanced by prioritizing them on the basis of their respective attributes in the environment of the ISN, so that priority of transmission can be given to those composite data frames containing the traffic component types assigned the higher priorities during periods of traffic congestion or when traffic flow otherwise requires control.

According to a feature of the present invention, the multimedia communication method and system utilizes a composite data frame configured with a multi-slotted payload, each slot being a channel which is allocated to a subscriber having requirements for transmission of a particular type of traffic component. The payload of the composite frame is divided into multiple channels and the channels are grouped according to traffic component type, with each grouping of plural channels in the frame referred to herein a traffic component slot, or simply, T-slot. The frames are composed with a particular configuration of channel assignments and inclusions on a per call connection basis, dedicated for the duration of the call connection, and may be reconfigured on request by subscriber according to established priorities or based on traffic conditions such as link congestion on the network.

Present day schemes provide static allocation of channels, and contention for channels by active connections. In contrast, the present invention allocates channels dynamically upon request at connection activation time (and deallocates on call termination); and there is no contention for channels—rather, the channels are dedicated to one connection for the entire duration of that connection. The multimedia information (voice, data, video and/or other traffic component type) to be transmitted from multiple subscribers located at a network entry point is assembled from the subscriber data streams into fixed size packets for consolidation in the same size channels allocated to the subscribers in the payload of a composite frame, provided that the various traffic components are all destined for the same network exit point. That is, assignment of the various subscriber data streams (of like or varying T-slot types) to the payload of a composite frame for transmission through the network is limited to those traffic components which share the same source node and same destination node in the network.

Hence, another object of the invention is to provide a composite data frame of variable size which is configured as a vehicle to convey through the network data streams emanating from subscribers at a source endpoint node of the network, in the form of a plurality of traffic component types, in channels grouped and of fixed size according to traffic component type, provided that the traffic components assembled within any given composite frame are destined for the same endpoint node.

According to another feature of the invention, the composite frames are assembled by fixed interval framing and transmitted through the network by synchronous frame launching. To that end, each packet is shipped at a predefined fixed interval of time relative to the timing of shipment of the immediately preceding packet, without regard to whether or not each channel in the packet is completely filled at that point in time. The synchronous frame launching is used to build composite frames with fixed channel sizes, which permits elimination of overhead control information including specification of channel size, amount of information to be received, and maximum amount of information to be transmitted on the connection, typically associated with other existing composite frame schemes. This reduces the amount of bandwidth required for transmission of the frames.

Another object of the invention, therefore, is to provide a fast packet switched integrated services network in which composite frames ar assembled and launched onto the network at fixed intervals of time, in which the fixed interval is consistent throughout the network.

Decomposition information is transmitted to the exit point for the composite frames in the network by specifying the number of channels being allocated and the traffic component type for each, in a separate control frame carried outside the composite data frames. The control frame is built by the local endpoint node and sent to the remote endpoint node, when a network subscriber requests a connection or termination of a connection. Each control frame is built to contain only the delta change from the prior frame format to the current frame format, identifying the channels being added or released in the composite frame to the network remote endpoint. When a channel or channels are added, the control frame must specify the traffic component type of each such channel.

According to an important aspect of the invention, if a subscriber is not fully active, in the sense that the information stream generated by that subscriber to be transmitted to the remote endpoint within the composite data frame being assembled at the local endpoint is inadequate to fill the channel allocated to that subscriber, that channel is eliminated from the frame. In this way, any unused bandwidth is compressed out of the composite frame payload before the frame is launched into the ISN.

A further object of the invention, then, is to provide bandwidth conservation in an integrated services network in which information is conveyed in the form of composite data frames containing a plurality of traffic component types, by a technique of compressing out of each frame any unused bandwidth.

Frame compression is one of three interrelated aspects of the invention which, however, may be employed independently in ISN FPS networks. The other two of this triumvirate are reconfiguration of the composite frames, and bandwidth seizing. As has been observed herein, the composite data frame is configured with the traffic component types assigned to respective separate groups of adjacent channels for each traffic component type, so that each group is limited to channels transporting traffic components of the same type, with each channel in a group assigned entirely to a selected subscriber associated with the traffic component type for that group. According to the invention, a composite frame is reconfigured to modify the channel assignments when necessary to accommodate priorities for traffic flow among the subscribers on a network path (virtual circuit path) between entry and exit points (the two endpoint nodes or fast packet switches of the virtual circuit path) of the ISN. Bandwidth seizing is implemented when, because of priority assignments among the various traffic component types relating to concepts of guaranteed bandwidth, and traffic congestion on the network or more specifically on links or trunks of the virtual circuit path of interest, bandwidth allocation is taken at least in part from one or more traffic component types and redistributed to another or other traffic component types.

Traffic flow control is initiated at a node along the network path of interest when a link on the path associated with that node exceeds a predetermined link utilization threshold level indicative of traffic congestion. Such flow control may be undertaken either when a request for additional bandwidth (i.e., the making available of a channel) is made by any traffic component type (or more specifically, a subscriber of that traffic component type) which is below its minimum guaranteed bandwidth, or when an unusually large number of subscribers at an endpoint node are simultaneously seeking to transmit information for assembly into composite data frames. The flow control affects those traffic component types which are exceeding their minimum guaranteed bandwidth, starting with those of lowest priority. For each composite data frame in the receive queue on the congested link of the affected transit node along the network path the node modifies a field in the header of the composite data frame to indicate that flow control is being exercised.

A reconfiguration request control frame is issued at the endpoint node of the subscriber needing additional bandwidth and meeting the necessary predetermined criteria. This request for additional bandwidth for the justified traffic component type will ultimately result in the seizure of bandwidth from any traffic component type which is exceeding its respective minimum guaranteed bandwidth in the composite data frames. At the endpoint node launching the composite frames to which the request applies, frame compression is implemented to unlock bandwidth by seizing it from the traffic component type(s) targeted by the reconfiguration request control packet. A less frequent posting of cells comprising portions of the information streams from the affected subscribers, for assembly into the composite frames, results in frame compression by eliminating some or all channels of the traffic component types associated with the excessive bandwidth usage in at least some of the composite data frames. The freed bandwidth is thereby reallocated or redistributed and the reconfiguration request control frame is dispatched to the next transit node along the network path when the traffic profile indicates that the associated link is no longer congested. The reconfiguration request control frame is a packet analogous to a call setup packet, and is transported along the same virtual circuit path as the composite data frames, but acts as a control element to change the format of the composite frames so long as the request is not blocked (rejected) by a node along the path. The existing format of the composite frames is contained in a template stored at each of the nodes along the path, and another stored template indicates the amount of change of bandwidth which is permitted for a particular traffic component type.

Therefore, yet another object of the invention is to provide a method and system for selectively reconfiguring composite data frames in an integrated services network as necessary for optimum bandwidth utilization, traffic flow and throughput performance.

Still another object is to provide a scheme for selectively seizing bandwidth from one or more traffic component types and redistributing the seized bandwidth to one or more other traffic component types having a greater priority for the bandwidth in an integrated services network.

According to still another aspect and feature of the invention, logical connections are established between subscribers at endpoint nodes of the ISN at the time of call setup, in the form of virtual circuits (VCs), and between pairs of endpoint nodes to accommodate a multiplicity of VCs, in the form of virtual circuit paths (VCPs), and the establishment, location and relocation of VCP anchors, at endpoint nodes within the ISN are adaptively controlled according to the needs of the network and its subscribers. Each endpoint node, or more precisely the point of multiplexing within the node, may anchor more than one VCP. Each VCP not only constitutes a logical connection between a pair of endpoint nodes, but has a one-to-one coupling with the composite data frame transported on it.

Information concerning each VCP anchored at a particular endpoint node (a fast packet switch) is stored at that node. In some instances a VCP is anchored at the trunk side of the switch fabric, and in other instances a VCP is anchored at the subscriber side of the switch fabric. The decision on where to anchor the VCP in these instances is based on the traffic patterns between the source and destination endpoint nodes, and includes such factors as whether the VCs to be multiplexed terminate on the VCP anchor node, whether all trunk line subsystems (TLSs) and subscriber line subsystems (SLSs) at the endpoint node have the capability of anchoring a VCP, and whether the subscriber data stream will pass through the switch fabric not more than once (except in the case of local switching).

The choices of whether to have multiple parallel VCPs between endpoint nodes and of where to locate the VCP anchor(s) within a particular endpoint node, are determined by the opportunity to multiplex VCs onto the VCP. Periodic reevaluation is performed within the ISN for optimal VCP anchor locations and VC loading (i.e., number of VCs multiplexed). As network traffic conditions change over time, the invention implements adaptive relocation of the VCP anchor to th optimal location for those conditions. Each endpoint node is made capable of rerouting VCPs, relocating VCP anchors, consolidating VCP anchors, and even subdividing a VCP. As the VC load increases between a pair of endpoint nodes, multiple SLS-anchored VCPs are consolidated into a single TLS-anchored VCP which uses the network-wide frame launch period. A TLS-anchored VCP may be converted to an SLS-anchored VCP when the VCP traffic load drops to a level in which the payload/header ratio of the composite data frames is unacceptably small. An existing VCP may be rerouted/reconnected if the existing route is not optimal for the network topology or traffic conditions.

According to this aspect of the invention, anchor relocation is triggered by either (1) relocation on demand, or (2) periodic relocation. In relocation on demand, anchor location is reevaluated during each VC call request from a subscriber. In periodic relocation, the relocation occurs at a fixed time or time interval. Periodic relocation is somewhat less likely to result in thrashing between anchor locations, than relocation on demand.

Accordingly, it is another object of the invention to provide methods and systems for adaptive control of VCPs in an integrated services network designed to transmit a multiplicity of traffic component types between endpoint nodes of the network within configurable composite data frames via VCPs established as logical connections between pairs of the endpoint nodes.

BRIEF DESCRIPTION OF THE DRAWINGS

The above and still further objects, features, aspects and attendant advantages of the present invention will become apparent from a consideration of the following detailed description of a presently preferred method and embodiment of the invention, taken in conjunction with the accompanying drawings, in which:

FIG. 1 is a simplified diagram useful for explaining some of the basic concepts of the integrated services network environment in which systems and methods of the present invention may be used;

FIG. 2 is a simplified block diagram of the basic structure of a packet switch useful for implementing certain concepts of the invention;

FIG. 13 is a block diagram useful for explaining a local switching example in VCP anchoring;

FIG. 14 is a graph illustrating a hypothetical case of the VCP anchoring process in real time;

FIG. 18 is a table indicating an exemplary link/T-slot profile for A bit set-up conditions in conjunction with bandwidth seizing;

DESCRIPTION OF PRESENTLY PREFERRED EMBODIMENT AND METHOD

Figure 3:
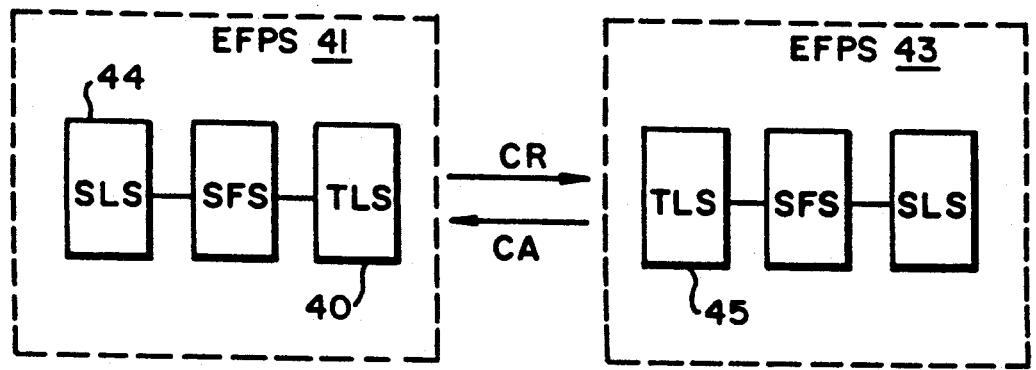
FIG. 3 is a block diagram of a pair of endpoint fast packet switches establishing a call connection, useful to explain source and destination designations on a VC or VCP.

Referring to FIG. a fast packet switch (FPS) network serving as an integrated services network (ISN) 10 of a type in which the present invention is employed transports multimedia information in data frames or packets, each possibly containing a plurality of traffic component types. The frames are transported at fast packet speeds between a pair of subscribers at endpoints of the network, such as endpoints A and B. Network 10 typically has a multiplicity of endpoints A, B, C, D, etc., each serving a plurality of subscribers, such as 11-1, 11-2, . . . , 11-n at endpoint A and 12-1, 12-2, . . . , 12-n at endpoint B. The actual number of subscribers served at the various endpoints of the network may differ from endpoint to endpoint.

According to an aspect of the invention, an endpoint fast packet node or switch (EFPS) is located at each endpoint, and a transit fast packet switch (TFPS, or sometimes referred to herein simply as a transit switch) is located at each of a multiplicity of intermediates nodes such as 13, 14 and 15, of network 10. Each transit switch accommodates a plurality of transmission links or trunks within network 10. Thus, a packet launched from endpoint A to endpoint B, for example, may travel through trunks 16, 17 and 18 across transit switches 13 and 14, or, depending upon the traffic conditions, through trunks 16, 19, 20 and 18 across transit switches 13, 15 and 14. Each EFPS and TFPS of the network is a packet switch in the form of a communication processor, but the EFPS and TFPS differ from one another in implementation or the algorithms they implement, as will be explained presently.

A logical connection established between two subscribers of the integrated services network through ordinary call set-up procedures is referred to herein as a virtual circuit (VC). For example, a VC is established between subscribers 11-1 and 12-3 for a call (communication session) between the two, and remains in place for the duration of that call. To reduce individual call processing, a plurality of VCs which share a single source-destination EFPS pair may be routed (actually multiplexed) by defining an end-to-end network path for them. Each such network path constitutes a single physical link referred to herein as a virtual circuit path (VCP). Thus, each VCP defines a logical connection between a particular pair of EFPSs such as the EFPS at endpoint A and the EFPS at endpoint B, or more specifically, between the points of VC multiplexing within the two EFPSs, in contrast to the logical connection between two subscribers defined by a VC.

A simplified block diagram of the basic switch or switching node structure 22 usable for each EFPS or TFPS is shown in FIG. 2. The different functionalities of the switch 22 are accommodated by the manner in which connections are made in the Switching Fabric Subsystem (SFS) 24, as will be described presently. SFS 24, Subscriber Line Subsystem(s) (SLS) 25 and Trunk Line Subsystem(s) (TLS) 26 provide the major infrastructure of the switch. SLS 25 includes one or more Universal Control Units (UCU) 27 each of which is associated with one or more Subscriber Processing Units (SPU) 28, and if desired, a Port Multiplexer/Controller (PMC) (not shown). The SPU(s) 28 and associated UCU 27 communicate via a system peripheral bus 30. The PMC may be used to provide extended multiplexed access and control to SFS 24.

Each SLS 25 supports system protocols, provides access to network subscribers (which, for example, may be individual telephone, T1 trunk, PBX signal, computer and/or other devices, lines or signals) on lines such as 31, 32, 33 and 34 at the endpoint where switch 22 is located (if the switch is used in the EFPS mode or functionality), and provides the interface to the SFS 24. The SPU 28 is implemented to provide access, support and control for the designated category of each of the subscriber lines, maintain intelligent interface to the associated UCU to provide flow control and network management functions bidirectionally on the peripheral bus, and perform all necessary native protocol emulation.

The UCU 27 is implemented to provide FPS internal protocol support in either of two modes, a tandem mode or a stand-alone mode. In the tandem mode, two UCUs share responsibility for configurable frame formatting and dispatching. Toward that end, the UCU in the SLS 25 sends subscriber data streams to an associated UCU in the TLS 26 for composition of the frame payload. In the stand-alone mode, the UCU in the SLS handles the entire process. In a sense, the UCU acts as a concentrator, receiving data from the various subscribers via the SPUs, concentrating the data, providing the necessary levels of functionality, and presents the data to the switching fabric (SFS) for routing to a TLS and subsequent transmission to the external world.

TLS 26 also has UCU(s) 36, which provides the functionality described above for the SLS/UCU(s), and Trunk Processing Unit(s) (TPU) 37, which provides access, support and control for the FPS trunk lines such as 38 and 39, and a physical interface to the associated UCU for frame transmission, error detection and correction, and synchronization. For example, the data from the SLS 25 is received at the TLS 26 after traversing the switching fabric, is collected by the UCU 36, composed in the frame payload and presented to the TPU 37 for transmission to the next node.

Several different connection scenarios—SLS to SLS, or SLS to TLS, or TLS to TLS—in the switching fabric are available (shown in dotted lines in FIG. 2) according to the desired use of the switch. The connection of TLS to TLS provides transit switch (TFPS) functionality. An SLS to TLS connection provides endpoint node (EFPS) functionality from the subscriber to the trunk; and SLS to SLS connection provides functionality internal to the node from one subscriber to another subscriber.

In the exemplary embodiment each SLS 25 and TLS 26 supports T1/T3 interfaces because this BW range is more suited to effective implementation of the composite frame, but other interfaces are not precluded. At T1/T3, the data stream at the SFS should be ≦1.544 mbps (2.048 mbps in European standard).

It is desirable at times to refer to "source" and "destination" or to use other, but analogous, terms to identify the two sides of a logical connection—whether in reference to subscriber connections (VCs) or EFPS connections (VCPs). The two sides of a connection will also be referred to sometimes herein as the local side and the remote side. At times, the remote side may be the destination side; and at other times, the remote side may be the source side. In the architecture for VCPs according to the present invention, however, the source side of the VCP connection is determined (i.e., designated) at the time that the particular VCP is created.

For example, referring to FIG. 3, a trunk line subsystem (TLS) 40 associated with EFPS 41 is implemented and organized to recognize the need to build a VCP upon receipt of a number of subscriber connection (VC) requests destined for the same endpoint EFPS 43, from subscriber line subsystems (SLSs) 44. At that point, TLS 40 initiates a VCP call request (CR) and sends it to the "destination" TLS 45 associated with EFPS 43. If TLS 45 responds to the CR with a call accept (CA), which will depend upon customary considerations for establishing a call, a VCP is established between the two endpoint EFPSs. Because the CR originated from the EFPS 41 side of the connection, that side is thereafter referred to as the "source" side of the VCP, and the other side—the EFPS 43 side—is termed the "destination" side, of this particular VCP.

The concept of source and destination sides of the connection is useful for a variety of reasons. For example, if the connection of interest were to be broken inadvertently, such as because of a link failure, or if re-synchronization (discussed below) of the connection (or the entire network) were required, it is desirable—indeed essential—that one side should be passive and the other side active. Accordingly, although the source side is somewhat arbitrarily designated, once that designation is made the source side becomes and remains responsible for all synchronization type activities. Hence, whenever an end to end network re-synchronization activity is required, the source side of the particular VCP connection performs that activity.

Figure 4:
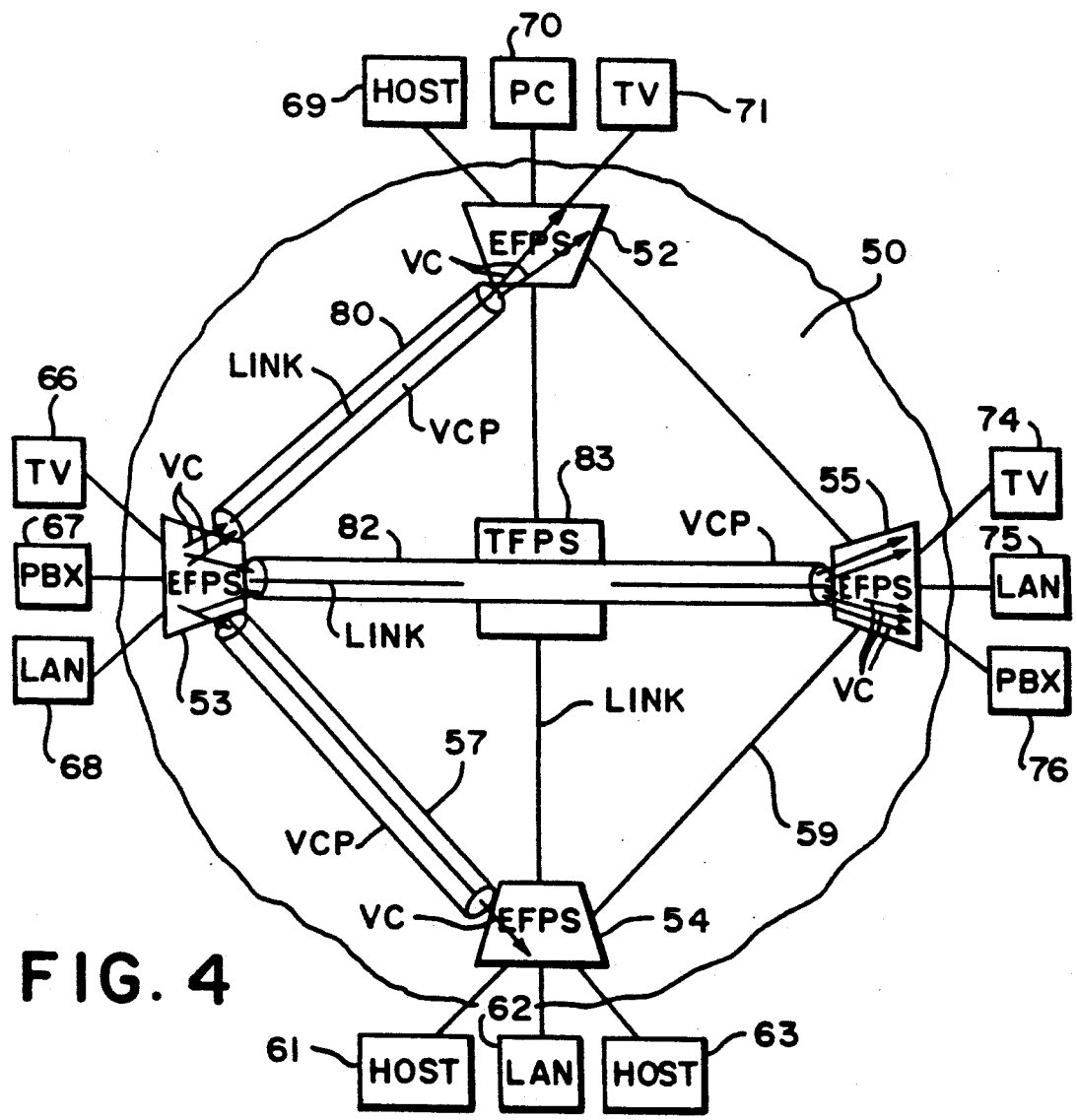
FIG. 4 is a block diagram illustrating the relationship of VCs to VCPs.

The relationship of VCs to VCPs is illustrated in the block diagram of FIG. 4. FPS network 50 is an integrated services network, and includes a multiplicity of EFPSs 52, 53, 54 and 55 each of which has a plurality of subscribers associated with it. Each EFPS has a TLS for each of the trunk lines (such as 57, 58 and 59 for EFPS 54) connected to that EFPS, and an SLS for the subscribers (such as 61, 62 and 63 for EFPS 54) associated with that EFPS, as described above for FIG. 2.

EFPS 53 has subscribers 66, 67 and 68 which have initiated call requests to subscribers at other endpoints of network 50, sufficient to justify the establishment of VCPs (EFPS connections) for the VCs (subscriber connections). For example, subscriber 66 associated with the latter EFPS has a VC with subscriber 71 of EFPS 52, and another VC exists with that same subscriber 71 and another subscriber at EFPS 53, resulting in the establishment of VCP 80. Subscriber 66 also has one VC with a subscriber (74) of EFPS 55, and other subscribers (67 and 68) of the same originating EFPS (53) also have VCs with subscribers (74, 75 and 76) of the same destination EFPS (55). These VCs sharing a common source/destination EFPS pair are multiplexed onto a single VCP 82, which traverses TFPS 83 (the only VCP transit hop in this example).

Although the VCP concept itself is not new, the concept is implemented in a unique and different manner according to the present invention, with considerable benefits accruing from establishing VCPs across the integrated services network as a result. The VCP is physically represented by the composite frame which can carry many different traffic component types. Traffic is allowed to flow in the form of numerous subscriber connections (VCs) occupying respective channels in composite data frames between many pairs of source and destination EFPSs. Most of the benefits of the VCP are enjoyed at the transit nodes (TFPSs), including, for example, a many-fold reduction in call setups and call clearings, the specific number depending on the ratio of packet processing for call setup/teardown to packet processing for data for transit hops (i.e., between transit nodes) in the network. The VCP connection remains in place for traffic—subscriber connections—between the same pair of EFPSs, and thereby eliminates the need for the TFPSs along the VCP to continually setup and tear down connections as VCs that connect individual subscribers are established and terminated. A beneficial fallout of this reduction in processing is that the TFPS need not perform routing, control block allocation/linkage/release, or recording/checking of state information, on a per call basis.

Another advantage is that assuming an average of, say, ten VCs multiplexed on a single VCP (which is not an inordinate number in this scheme), an order of magnitude reduction in memory requirements for VC control would be enjoyed at each TFPS. A further advantage is that network processing and delay for link and node failures are reduced by an order of magnitude at the transit nodes by virtue of their need to perform reconnect processing only for their respective VCPs, rather than for every VC that traverses the node.

Although the source and destination EFPSs do not share these benefits directly with the TFPSs, they, too, perform less packet processing than would be the case without VCPs. This is because there is no inherent protocol conversion or packet reformatting associated with the VCP scheme.

The advantages of establishing VCPs increase with increases in the traffic load and with decreases in traffic fan-out (i.e., increases in concentration). As more VCs share source/destination EFPS pairs, more VCs can be multiplexed per VCP. Hence, the greatest benefits of VCPs are enjoyed on paths of highest traffic concentration between endpoint nodes. As will be described presently, the present invention provides techniques and implementations by which the VCPs may be anchored adaptively to different switching nodes of the integrated services network In fast packet switching networks, a conflict typically exists between the requirements of low delay, high throughput, and maximum bandwidth utilization. It becomes highly desirable to develop a data frame or packet format which will resolve the conflict, but the prior art schemes have not proved successful in that regard. For example, if the frame is small, with a ratio of payload size to header size approaching unity, it has a good packetization delay in that frames are launched relatively quickly, because the payload channel is filled rapidly with the subscriber data stream. On the other and, each frame has as much as 50% of its bandwidth devoted (i.e., locked) to header information, and the balance devoted to the payload, which constitutes very poor bandwidth utilization. Also, this type of frame format results in a low effective packet switch throughput because each frame contains a relatively small amount of payload data and a relatively large amount of header or control information. A large number of frames must be switched to transfer any significant amount of data since the switch processing time and complexity is a function of the size of the header, and is not favorably affected by the small size of the payload.

If the frame is too large, in the sense that the ratio of payload size to header size is substantial, packetization delay is poor in low speed applications because the payload channel takes an inordinate amount of time to fill. On the other hand, if such a frame format is utilized in short burst applications, the frames will be launched with little delay but with a relatively large amount of unoccupied space in the payload channel, i.e., the frame has a great amount of its bandwidth devoted to unused payload, and thus represents poor bandwidth utilization. The foregoing and other drawbacks are found in the fixed size single subscriber payload frame (or cell) proposed by the CCITT ATM standard. The current ATM standard is a cell having a payload size of 48 bytes and a header size of five bytes.

The use of a variable size single subscriber payload frame also produces a poor result. The X.25 standard is such a frame format, with payload size ranging up to 4,096 bytes, in addition to header, and suffers from poor bandwidth utilization and switch throughput for short burst data for the same reasons as those applicable to small fixed size payloads. Also, more complex algorithms are required to handle the worst case delay and packet jitter experienced for isochronous services in a multimedia network.

The configurable frame format of the system and method of the present invention is a distinct improvement over the fixed size and variable size payload frames of the prior art. A preferred method and embodiment utilizing such a format will now be described for a suitable high speed data (fast packet) network.

Only the subscriber data streams at an EFPS which are intended to be sent to another, common EFPS of the ISN network (or of another network linked to that network) may be combined or assembled in the same composite data frame. It will be understood that in this context, the term "data" is used in a broad sense, encompassing data, voice, video and any other traffic component types. For example, referring again to network 10 of FIG. 1, if several subscribers at endpoint A are sending data to subscribers at endpoint B during a given time interval, the data streams of those endpoint A subscribers may be combined in composite data frames by the EFPS at endpoint A. These frames are then launched to be transported through the network to endpoint B for appropriate distribution to the respective subscriber destinations.

In keeping with the previous discussion of source and destination labels, although certain subscribers, switches or endpoints may be variously described as entry, source or origination, or as exit or destination, or by analogous terminology, any of them may (and typically will) act as both a source and a destination, in the customary sense, in any communication session(s) across the network. In other words, data may flow in both directions in any given VC over the course of the connection between the two subscribers. However, the previously mentioned convention of "source" and "destination" designations for purposes of the architecture of the system continues to apply.

Figure 5:
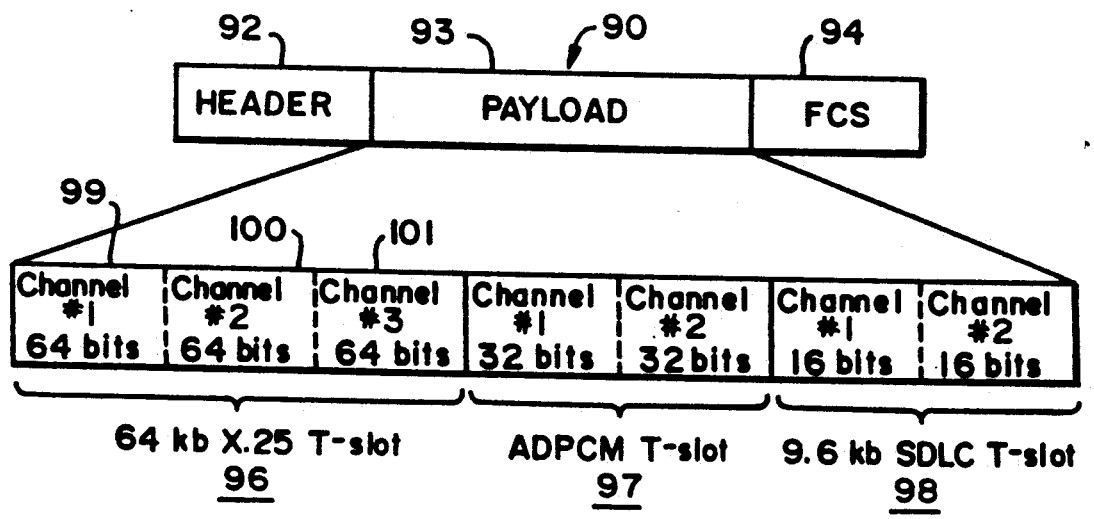
FIG. 5 is a representation of an exemplary composite data frame according to the preferred embodiment and method of the invention, with a fixed payload size and composition accommodating a plurality of traffic component types.

Referring to FIG. 5, an exemplary composite data frame according to the invention has a fixed payload size but is composed in a way to accommodate a plurality of traffic component types. Exemplary composite data frame 90 is 192 bytes in length, including a header 92, payload 93 and frame check sequence (FCS) 94. Payload 93 contains the information to be communicated to subscribers at the destination endpoint. The payload is divided into traffic component slots (referred to herein as T-slots) 96, 97 and 98, in this example, with grouping according to traffic component type (such as voice and data here, although other components such as video may also be included in a separate T-slot of the frame). That is, each T-slot is dedicated to subscriber connections of the same traffic component type. In turn, each T-slot is subdivided into multiple channels, such as the three channels 99, 100 and 101 for T-slot 96.

According to the preferred embodiment and method of the invention, each channel of a T-slot is allocated when a subscriber connection is requested, and remains dedicated to that single active subscriber connection (VC) for the life of the connection. The channel is released only when the connection is terminated. An alternative scheme is to configure and reconfigure the data frame with each start and end of a burst, and to allocate the channel only for the duration of the burst. However, the latter scheme requires more configuring and reconfiguring of the frames and more overhead and control information to be transported through the network than the duration of connection technique. Consequently, the preferred technique provides a relative reduction in packet configuration/reconfiguration and bandwidth overhead requirements. An additional advantage of the duration of connection technique, namely, no loss of data, is realized from the frame compression mechanism which is another aspect of the invention, to be described presently.

In the illustrative example of FIG. 5, payload 93 of the composite data frame is assembled from three different traffic component types—64 kilobit (kb) X.25 data, adaptive pulse code modulation (ADPCM) voice, and 9.6 kb SDLC (Synchronous Data Link Control) data—which are consequently grouped in three T-slots. The number of T-slots in the payload of the frame and the number of channels per T-slot may be more or less than are shown in this example, subject to the limitation of frame length. With the composite framing technique of the present invention, each frame may be configured and reconfigured according to the transmission needs and traffic component types of the various subscribers at each EFPS.

According to a further feature of the system and method of the invention, the channel sizes in each composite data frame (such as that of FIG. 5) are T-slot specific, and this condition exists network-wide, which has the advantage of eliminating the need for control information to specify channel size. That is, all channels of a specific T-slot type (such as X.25 data) in all frames on all VCPs in the ISN network are of equal size, and, because this is a known quantity, the overhead (bandwidth) which would otherwise be required to designate channel length is eliminated from the frame. Selection of channel length is made statically by the network administrator, according to the nature of the respective traffic component. In the example of FIG. 5, the selection of channel sizes for the three T-slots is based on a single traffic component type attribute or characteristic, namely, the ratio of "subscriber line rate" to "packetization delay". However, in practice many other attributes (such as activity level, burst size, and so forth) may be considered.

Another example of an important attribute for packet switched services in the context of the present invention is average packet length, because it is desirable to put an entire packet into a single channel of the composite data frame. If that is not feasible, it is desirable to minimize the amount of chopping or dissection of the data. For example, in an extreme case one packet may be 128 bytes long and another may be 10,000 bytes long. The development of an appropriate compromise is relegated to selecting the optimum increment for dividing up the packet. Another important attribute for isochronous and circuit switched services is sensitivity to delay, which also dictates buffering and packetization delay. For example, if the buffer is very small, it is necessary to packetize and ship out the data as soon as it is accumulated. In those circumstances, the channel size should be selected to be as small as practicable, because the larger the channel size the more delay is introduced into the system. On the other hand, in the case of a variable bit rate source, there is a probability of overflow of the internal buffers. If the channel is too small, the probability of buffer overflow is high, and with each overflow some data is lost. It is necessary in those circumstances to increase the buffer or the channel size. In the case of the channel the frame compression mechanism of the present invention is available, but in the case of the buffer there is underutilization which, nevertheless, is acceptable with a variable bit rate source because although infrequent, the buffer can be filled quickly when high speed (bit rate) data is being received at the buffer. For the variable bit rate source, one attribute is the probability of overflowing the buffer or channel.

According to an aspect of the invention, each VCP of the ISN network has an autonomous composite data frame format which is defined and managed by the anchoring EFPSs at the source side and the destination side of the respective VCP. That is, each VCP has only one frame format associated with it at any given time. The frame format may be set permanently at the time that the frame is configured; or it may be reconfigured dynamically by either of the EFPSs anchoring the VCP upon detection of a subscriber connection (VC) request or release, which is the preferred scheme. The VC request (for addition of a channel) or release (by deletion of a channel) is contained in a frame reconfiguration request (FRR, which will be discussed in greater detail presently) issued by the EFPS which is servicing the active subscriber (i.e., the subscriber desiring to add or to release a channel). An FRR is never issued by a TFPS, for reasons which will become apparent in the subsequent description of this feature herein.

The composite data frame payload format, to the extent that it is reconfigured (and only upon such reconfiguration), is set forth in a delta change template (i.e., signifying only the changes from the prior format) which is conveyed within a control frame by the local anchor EFPS to each of the transit nodes (TFPSs) of the VCP and to the remote anchor EFPS. This "payload format template" is stored at each of those nodes.

The composite data frames are composed and decomposed from and to the data streams of the respective subscribers, only by the local and remote EFPSs constituting the anchor nodes for the VCP, and never by the TFPSs along the VCP. Each composite data frame has a format exemplified by FIG. 5, discussed above. The frame format is transparent on the transit nodes except during periods of output link congestion.

As described above, during frame composition a dedicated fixed size channel is allocated in the composite data frame payload for each subscriber connection (VC) multiplexed onto the VCP. The channels are grouped together in T-slots (traffic component types) in the payload. Channel sizes may vary from T-slot type to T-slot type, but are a predefined fixed size for any given T-slot type, network-wide. Thus, in FIG. 5, for example, the X.25 T-slot 96 has three channels 99, 100, 101 of equal size, each having a 64 bit length. The PCM voice T-slot 97 has two channels of equal size, each having a 32 bit length. And the SDLC data T-slot 98 has two channels of equal (16 bit) size.

Because the channel size for each particular T-slot type is the same on a network-wide basis, and is known throughout the network, it need not by carried within each frame as part of the control information, thereby conserving bandwidth. Only the T-slot type, its position in the frame, and number of channels need be communicated in order to provide a complete picture for decomposition of the frame at the destination VCP. The principal criteria for setting channel size are (1) subscriber interface speed and (2) activity level of the T-slot type. In the preferred embodiment, the header size is a minimum of 5 bytes in a composite data frame maximum length of 192 bytes.

The composite data frame format in general, and the payload format in particular, provide a number of benefits when compared to other payload formats such as fixed size single subscriber payload format and variable size single subscriber payload format. One benefit is related to the traditional capability of network subscribers to optimize resources by performing multi-subscriber multiplexing outside the network, for example, by installing a control unit between the network and a cluster of 3270 terminals. This type of optimization is extended by the network, by means of the configurable frame format, across dissimilar devices and traffic components provided that they share the same source/destination EFPS pair. Moreover, the shared payload scheme of the invention possesses advantages over traditional packet network multiplexing schemes. One such advantage is the capability to improve bandwidth utilization by providing a larger payload size to header size ratio without the normal packetization delay. Another is that the effective switch throughput is increased by carrying the subscriber data streams with larger payloads, in that for a given volume of subscriber data, throughput is more a factor of frame count than frame size. For example, considerably more processing is required for one thousand 100-byte packets than for one hundred 1,000-byte packets.

By configuring the VCP composite data frames with many very small channels (e.g., 2 bytes), to create the illusion of a continuous bit stream with no packet jitter, the packet switched network assumes the circuit switched network characteristics of enhanced transmission quality. Thereby, the configurable composite data frame may be used as part of a circuit/packet switch hybrid product. The frame may also be configured to accommodate ATM schemes and large payload fast packet switch schemes.

The composite data frame header fields are functionally analogous to header fields in ATM cells and LAPD (link access procedure) frames, the major differences being in format to reflect the requirements of an end-to-end protocol in contrast to the interface protocols addressed by standards of the latter two packet types. FIG. 6 presents a simplified comparison of the three packet types, with the composite data frame for the preferred embodiment of the present invention shown in part (a) and the ATM cell and LAPD frame of the prior art shown in parts (b) and (c), respectively.

Figure 6A:
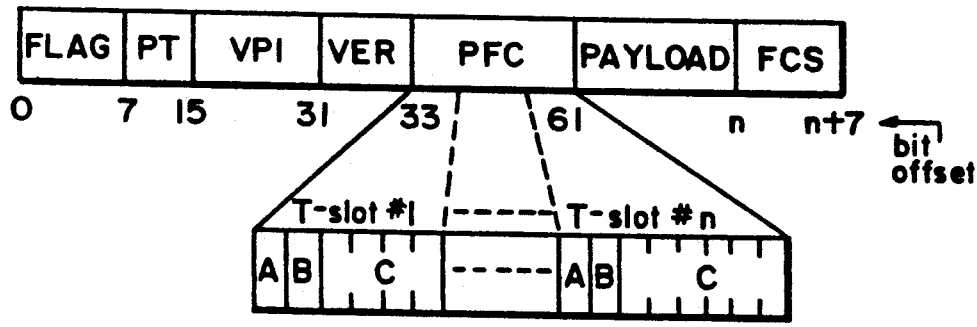
FIG. 6 is a simplified comparison of three different packet types, the composite data frame according to the preferred embodiment and method of the present invention being shown in part (a), and the ATM cell and LAPD frame of the prior art being shown in parts (b) and (c), respectively.

Referring to FIG. 6(a), the FLAG field is a frame delimiting flag required for synchronization because of the variable frame lengths. The trailer flag of a preceding frame may act as the preamble flag of the next frame. The PT (payload type) field identifies the frame type, i.e., a data frame or one of the defined control frames. This is unlike the (ATM cell header PT field (FIG. 6(b)) in the following respects: (1) in the data frame of the present invention, the PT field precedes the VPI (virtual path ID) field because both will be considered simultaneously for switching purposes and the PT field has higher precedence; and (2) the PT field is larger than the ATM cell PT field because of the added control frame types required by the internal protocol.

The VPI field of the composite data frame has loca input/output link significance. Two bytes allow for up to 64,000 possible VCPs to traverse a given link—a worst case which allows for maximum utilization of a T3 link with an average VCP activity level of only 700 bits per second (45 mbps/64k VCPs=700 bps per VCP). The VER (version number of the data frame) field provides the version number which is needed for synchronization because the payload format is dynamically modifiable via VCP control frames. The VCP source and destination anchors (EFPSs) have a one bit version number to toggle for this purpose.

Figure 6B:
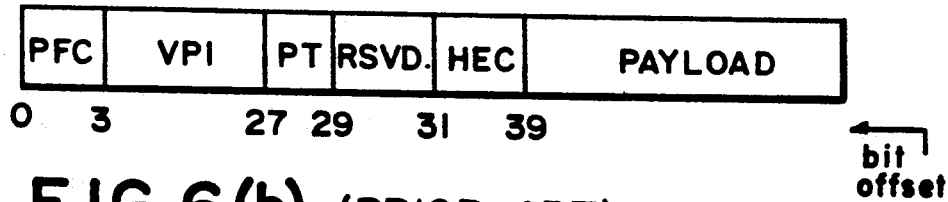
Figure 6C:
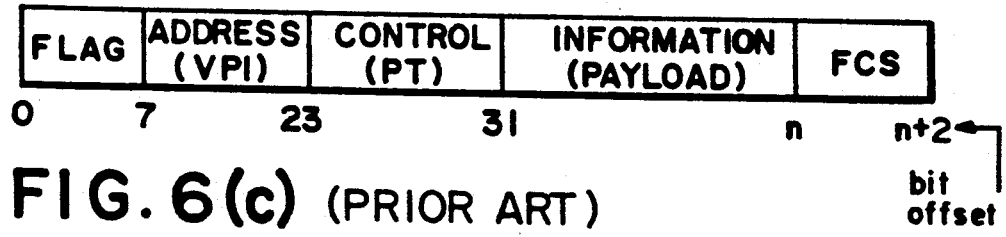

A significant feature of the composite data frame of the present invention which serves, in part, to distinguish it from frames, packets or cells of the prior art (whether those shown in FIG. 6(b) and (c) or otherwise), is the PFC field. In the composite data frame of FIG. 6(a) this field provides prioritized flow control (PFC). It will be observed that the ATM cell has a PFC (priority fairness control) field as the initial field in its header which, however, is understood thus far to be undefined by CCITT. According to the present invention, prioritized flow control as encompassed by the PFC field of composite data frame header is used for the purpose of providing frame compression, to conserve bandwidth and optimize bandwidth usage. This technique will be discussed in detail below, but for the present it is only necessary to briefly mention some aspects of the PFC field.

The PFC field of FIG. 6(a) has three types of bits for each T-slot: a single A bit for flow control, and a single B bit and a number of C bits equal to the number of channels in the T-slot, the C and B bits being referred to herein as "presence" bits. The A bit is used by any TFPS or anchor EFPS of the VCP to inform the TLS or SLS therein of the requirement and severity of flow control. For example, A=1 indicates that flow control is required; whereas A=0 indicates that no flow control is required. The B bit is used by the VCP anchors to indicate an absence of all channels associated with this T-slot in the composite data frame (i.e., that the frame is compressed). For example, if B=1 the T-slot identified by that bit is present, and if B=0 the T-slot is not present (i.e., all of the channels associated with that T-slot are absent). The C bits are associated with the respective channels of the T-slot, one bit per channel, and are used by the VCP anchors to indicate frame compression (absence of the channel) attributable to either subscriber inactivity or flow control. For example, if C=1 the channel identified by that bit in that specific T-slot is present, and if C=0 that channel is not present in the T-slot.

It follows that if, for example, a frame has three T-slots and four channels in each T-slot, the PFC field would contain three A bits, three B bits and twelve C bits (positioned in the sequence A, B, C for each T-slot as shown in FIG. 6(a)). If B=0 for a particular T-slot, none of its associated C bits are carried in the field; i.e., if a T-slot is not present, none of the channels associated with that T-slot is present in the data frame, and no bandwidth need be allocated in the payload for the corresponding channels.

Thus, the PFC bits provide a complete picture of the state of flow control required for the respective T-slot at the network nodes traversed by the particular VCP. This control information is built into the frame header by the source EFPS during frame composition, and neither the transit switches on that VCP nor the destination EFPS for that frame can modify the B and C bits. However, each FPS (TFPS or EFPS) can change the value of the A bit to trigger flow control, when necessary. In essence, the B and C bits are used during frame decomposition to communicate whether there is frame compression as a result of the absence of the associated T-slot or a channel thereof, either because of inactivity of the respective subscriber(s) or because of flow control.

The PFC field of the composite data frame header is immediately followed by the payload, which is followed by an FCS (frame check sequence). Just as in the case of the FCS of the LAPD frame of FIG. 6(c), this FCS applies to the entire frame. The ATM HEC (header error check) field of FIG. 6(b) is analogous to a frame check sequence, but applies only to the header. Application of a check sequence to the entire frame is desirable because it provides an additional level of network integrity through payload error detection. In this respect, it is also noteworthy that ATM is targeted for 100% fiber optic networks which have very low bit error rates. The composite data frame FCS in the preferred embodiment of the invention is only one byte long compared to the two byte LAPD FCS, but nevertheless provides a comparatively high level of integrity because of the maximum frame length of 192 bytes versus 4,096 bytes for the LAPD frame.

For ATM, the cell (packet) payload is a single channel of fixed size as shown in FIG. 6 (b), and successive cells are launched asynchronously only after the subscriber data stream has filled the channel. A feature of the system and method of the present invention is that the composite data frames are launched synchronously. This is a departure from conventional principles of circuit switched networks, which are invariably synchronous, and packet switched networks, which are invariably asynchronous. The synchronous frame launching further enhances the performance characteristics of the packet switched network (beyond enhancement obtained from other features of the invention, such as the use of a frame with many relatively small channels), to provide improved transmission quality comparable to that of circuit switched networks, while retaining the bandwidth savings advantage of packet switching. Isochronous services such as voice and video are provided with near circuit switching quality jitter and delay characteristics by employing this combination of fixed short time interval packetization and synchronous frame launching onto the ISN network. Synchronous frame launching also permits fixed size channels on a "per T-slot" basis, and consequent elimination of any need to transmit channel length control information for purposes of frame decomposition.

Figure 7:
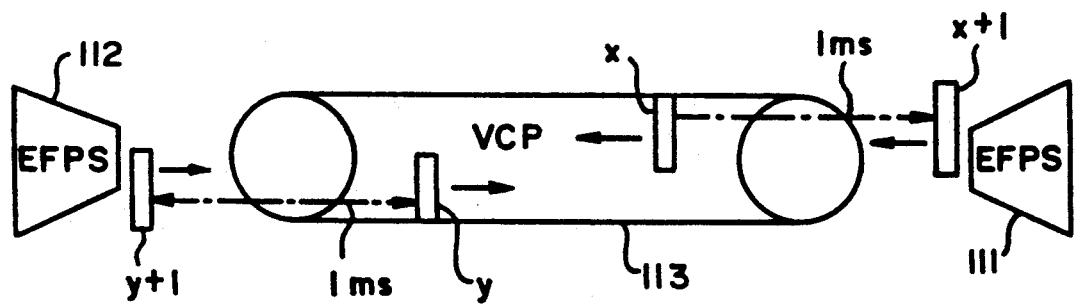
FIG. 7 is a simplified block diagrammatic representation of a VCP With synchronous frame launching according to the invention

A simplified block diagrammatic representation of a VCP with synchronous frame launching is shown in FIG. 7. EFPSs 111 and 112 anchoring VCP 113 are responsible for frame composition/decomposition at their respective endpoints. Each of those EFPSs composes and transmits a composite data frame (x and y, respectively) toward the remote EFPS anchor (112 and 111 as the case may be, in this example) at a fixed time interval relative to the last frame launching and to the next frame launching. This time interval, which is synonymous with packetization delay, is configurable on a network-wide basis, and may be, say, one or two milliseconds (ms) in length. In the preferred embodiment, a launch interval of one ms is used throughout the network for synchronous frame launching. As a consequence of this network-wide synchronous frame launching, the launch interval information is known at each switch along the VCP, whether TFPS or EFPS. The only additional information which is required for frame decomposition at the remote EFPS is the number of channels allocated in the frame and the traffic component type of each channel. This not only simplifies the decomposition process, but, by reducing the amount of control information which must be carried in the frame, results in a significant saving of bandwidth.

An EFPS, or more precisely the point of multiplexing within the EFPS, may anchor more than one VCP. However, for each VCP established as a logical connection between a pair of EFPSs, there is a one-to-one coupling with the composite data frame transported on it. In the example of FIG. 7, EFPS 111 launches composite data frame x+1 one ms after frame x was launched. Similarly, the other anchor for this VCP, EFPS 112 launches composite data frame y+1 one ms after frame y. The channels in each frame payload contain subscriber data which was accumulated during the one ms since the last frame was launched from that EFPS. For example, 8 bytes is the maximum amount of data which can be accumulated for a 64 kb PCM voice subscriber in a one ms frame launch network (64 kb/1000=64 bits=8 bytes). A two ms frame launch network would require double the optimal channel size for a given T-slot (e.g., 64 kb PCM voice T-slot can fill a 16-byte channel in two ms). Thus, the frame launch time should be optimized for the T-slot types intended to be transported by the particular ISN network.

A decision as to whether to send a partially filled channel or to delay until the next frame launch will depend on the attributes of the T-slot type to which that decision applies. In any event, the PFC field in the header of each composite data frame will signify any channel omission, and thus frame compression that may be present, with an elimination of otherwise wasted bandwidth.

The composite data frame format scheme and synchronous frame launch scheme have a certain dependency, and consequently, overlapping benefits such as virtual elimination of one of the two major "quality of service" differences between packet and circuit switched networks, namely, packetization delay. (The other, bandwidth reservation, will be discussed presently). Various other benefits accrue in the packet switched ISN from the use of synchronous frame launching. One is a substantial reduction in packet jitter for isochronous services subscribers. Major contributors of packet jitter and packetization delay in prior art techniques are (i) variable sized packets and/or indeterminate "packet launch times" attempting to fully utilize a fixed size frame, and (ii) long periods of subscriber data buffering in an attempt to improve header size/payload size ratio. Among solutions which have been proposed in the prior art to alleviate these problems are the use of (i) partially filled ATM cells (less than 50% bandwidth utilization for PCM voice); (ii) echo cancellation equipment at each subscriber port; and/or (iii) packet payload sharing among several subscribers. The present invention utilizes a variation of the latter technique in one of its aspects, in a manner which is a considerable improvement from standpoints of simplicity and effectiveness, over the specific solutions heretofore proposed.

Among other benefits obtained from the us of synchronous frame launching in the ISN FPS network of the invention are a reduced occurrence of partially empty payloads as a result of smaller payload channels, with an attendant improvement in bandwidth utilization; and the capability to accurately calculate worst case traffic spikes at the transit nodes as a result of a fixed frame launch period in conjunction with a fixed channel size, which allows better management of bandwidth reservation and allocation. Also, network frame loss has significantly less impact on isochronous services subscribers, because of the smaller channel sizes.

Figure 8:
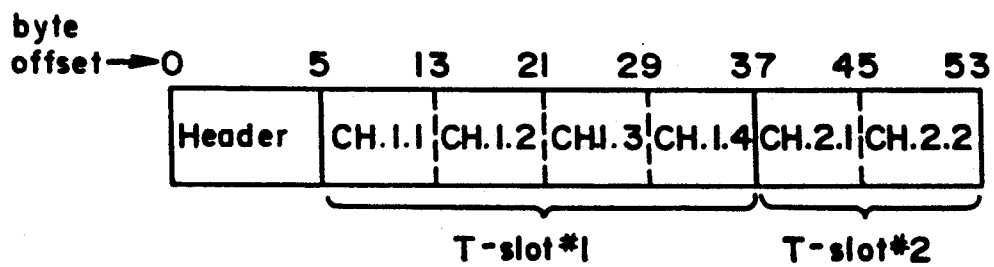
FIG. 8 is a representation of a composite data frame which provides an illustrative example of payload size for a plurality of highly active subscribers

The advantages of synchronous frame launching in the ISN network are greatest when multiple subscribers actively share each VCP, so that the payload channel count (i.e., payload size) is sufficiently large to maintain a good ratio of payload size to header size while using a relatively short launch time interval. An example of a payload size resulting from six "highly active" 64 kb subscribers is illustrated in FIG. 8. The network-wide frame launch time is one ms in this example. T-slot I is 64 kb transparent circuit mode voice, and has four channels (one for each of these voice subscribers).

T slot 2 is composed of a 64 kb subscriber frame relayed data stream, with two channels (one for each of those data subscribers). It should be noted that, in this example, although all of the subscribers' data streams have the same speed (64 kb), and the channel size for both of the two T-slots is the same (8 bytes), the payload contains two different traffic component types, i.e., (1) voice and (2) frame relayed data. The VCP on which this composite data frame is transported is capable of fully utilizing the frame with an overall header and payload size equal to that of an ATM cell, and a ratio of payload size to header size of approximately ten, while complying with only a one ms packetization delay.

In systems of the present invention, multi-media traffic integration with predictable service quality and transmission facility economy is provided with minimal network management system (NMS) configuration and intervention activity. Bandwidth management intelligence is provided by the FPS network itself. The NMS parameters include network-wide configurable parameters and transmission link specific parameters. The network-wide parameters, which permit traffic-driven specification of the network, complete control of the trade-off between quality of service (on a per-T-slot basis) and transmission facility utilization, and prioritization by T-slot, include those listed in Table I, below. T-slot type channel sizes are indicated in Table II. Rather than designating a particular traffic component with a priority level for all of its attributes, it may be desirable, and is preferred in the embodiment and method of the invention described herein, that a priority level be assigned for each different attribute of the traffic component (including attributes such as delay sensitivity, loss tolerance, activity level, burst size, average packet length, probability of buffer or channel overflow, etc.). Priority is used during flow control/congestion situations to determine which traffic components should be call blocked and/or put in a degraded service mode.

The NMS transmission link specific parameters allow the NMS to divide the network into autonomous service points/regions, and to control at each point (during peak traffic loads) the quality of service on a per T-slot type basis. These parameters include link utilization threshold and T-slot bandwidth allocation profile, the latter including T-slot minimum guaranteed bandwidth, T-slot maximum allowable bandwidth, and call block threshold, listed in Tables III and IV, respectively, below. All values set forth in these tables are presented for the sake of example only.

TABLE I

| Name | Range | Default | Comment/Default Rationale |
|---|---|---|---|
| max frame size | 16–192 (bytes) | 192 | Preferred FPS network BW manager for optimizing |
| frame launch interval | 1–5 ms | 1 ms | Shortest interval permitting adequately large channels to be fully utilized[1] |
| max T-slots per frame | 1–5 | 4[2] | More would lead to excessively large PFC field, and cumbersome congestion processing on transit nodes |
| max channels per frame | 1–30 | 20 | Default value based on T1 & T3 trunks, w/low-end subscriber rate of 64 kb (i.e. channel size 6 to 8 bytes) |
| min channel size | 2–187 (bytes) | 2 | Allows full channel utilization down to 16 kb subscriber w/o "sub-multiplexing outside network |
| max channel size | 2–187 (bytes) | 187 | Good compromise between memory mgmt limitations & industry optimal size?[3] |
| max T-slot types | 1–32 | 16 | Consistent with ATM standard of 16 priority levels |

TABLE I-continued

| Name | Range | Default | Comment/Default Rationale |
|---|---|---|---|
| ntwk-wide T-slot type channel size | See Table II | | |

[1] Value directly impacts channel size of each T-slot type. As launch time increases, channel size can increase with full payload 40 utilization. The trade-off is increased packetization delay.

[2] If a source/destination EPPS pair must carry more T-slots or channels simultaneously, addl. VCPs may be set up between the pair.

[3] Small enough to manage max packet size in a single buffer throughout system (incl. switch fabric). European group prefers 32–45 byte "channels", while other extreme advocates 600-byte "channels"

TABLE II

T-SLOT TYPE CHANNEL SIZES[4]

| T-slot (priority)[5] | T-slot Description | Channel Size (No. of Bytes) |
|---|---|---|
| 0 | low scan video | 75 |
| 1 | ADPCM voice (32 kb) | 4 |
| 2 | 64 kb packet data | 8 |
| . | | |
| . | | |
| 31 | — | — |

[4] T-slot descriptions and channel size values are exemplary 40 only.

[5] Priority is used during flow control/congestion situations to determine which traffic components should be call blocked and/or put in a degraded service mode.

TABLE III

LINK UTILIZATION THRESHOLD

| Level | Threshold |
|---|---|
| 1 | 50% |
| 2 | 65% |
| 3 | 80% |
| 4 | 90% |

Each increasing threshold affects one or a range of T-slot types with higher priority.

"Threshold" is a measure of actual (current) bit usage as a percentage of link bit rate (i.e., 750 kbps actual on 1.5 mbps link = 50% threshold). The effective bit rate (amount of subscriber data transmitted) is less than or equal to actual bit usage, because of header fields and partially empty payloads.

[4] T-slot descriptions and channel size values are exemplary 40 only.

[5] Priority is used during flow control/congestion situations to determine which traffic components should be call blocked and/or put in a degraded service mode.

TABLE IV

T-SLOT BANDWIDTH ALLOCATION PROFILE TABLE

| T-slot Type | Min Guaranteed BW (as % of link bit rate) | Max Allowable BW | Call Block Threshold (Link Utilization Threshold) |
|---|---|---|---|
| 0 | 10% | 50% | 4 |
| 1 | 20% | 50% | 1 |
| 2 | 10% | 50% | 1 |
| 3 | 30% | 30% | 2 |
| . | | | |
| . | | | |

TABLE IV-continued

T-SLOT BANDWIDTH ALLOCATION PROFILE TABLE

| T-slot Type | Min Guaranteed BW (as % of link bit rate) | Max Allowable BW | Call Block Threshold (Link Utilization Threshold) |
|---|---|---|---|
| 31 | — | — | — |

Total < max
link utilization
threshold value

Notes to Table IV:
A T-slot type may exceed its maximum guaranteed bandwidth during low traffic conditions, but the FPS can seize back (by flow control and call blocking, to be explained in more detail below) all of the bandwidth exceeding the minimum guaranteed level. Seizing proceeds on a schedule of lowest priority first.
By setting values for min guaranteed BW and max allowable BW close together, the NMS can ensure the quality and predictability of service to the T-slot because this assures that BW will not be seized away and redistributed to another T-slot type. Setting the values far apart allows delay-insensitive T-slot types to far exceed their min guaranteed BW, with the risk of flow control delay if traffic load increases from other T-slots.
Call block threshold is a measurement of total BW in use by all T-slot types on the link. It is not enforced (not relevant) unless the request for BW is by a T-slot type whose minimum guaranteed BW is already exceeded. The purpose of this parameter is to allow the NMS to reserve BW for high priority T-slot types, even when they are inactive, by blocking lower priority T-slots. Such configuration may be used to prevent BW allocation policy thrashing — where BW is constantly redistributed among several contending T-slot types.

Another key aspect of systems according to the invention is that within the framework of the NMS configuration parameters, the ISN FPS network policies maximize effective link throughput by providing on-demand bandwidth distribution/redistribution among T-slot types while generating minimal control information traffic. Toward that end, the SPU of the SLS (described in conjunction with FIG. 2 above) supports the native protocol, and reserves bandwidth on the VCP by requesting a channel of the appropriate T-slot type from the local VCP anchor (EFPS). In a request for bandwidth, the SPU requests or releases the associated VCP channel upon receipt of a connection request (call request) or connection release (call release) from the subscriber to which that channel is allocated. In the preferred embodiment, for at least some T-slot types with a high volume of short duration connections to the same destination, the SPU will hold a pool of channels on the VCP and request/release channels on the basis of the current number of active calls on those channels within a predetermined high/low threshold, rather than on a per subscriber call basis. This type of multiplexing is transparent to the system protocol, which views each channel as a single, indivisible subscriber entity.

Referring back to FIG. 2, the SPU such as 28 selects the desired VCP for the request/release based on a suitable FPS routing algorithm stored in the switch in which the SPU is located. If the current VCP has reached its maximum size, or if there is no VCP to the desired destination EFPS, a new VCP is sought to be established by the local anchor EFPS. The SPU channel requests are sent to the TLS 26 anchoring the VCP. Channel requests/releases are initiated only at the VCP anchor EFPSs, but TFPSs along the VCP may reject requests based on link traffic conditions and based on the NMS transmission link specific parameters described in connection with Tables III and IV above.

In the processing of bandwidth requests, for each channel request/release by the SPU, the associated local VCP anchor EFPS builds and launches a composite data frame reconfiguration request (FRR) control frame. When multiple reconfiguration requests for a VCP are received by the TLS during a single frame launch period, all of those requests are combined into a single FRR control frame. In response to receipt of the FRR control frame (or simply, FRR) each successive TFPS on the VCP and the remote anchor EFPS, in turn, will either (i) reserve the requested bandwidth and relay the FRR to the next node (transit or endpoint, as the case may be), or (ii) send a rejection (i.e., refusal to reserve the requested bandwidth) back to the originating anchor, depending on traffic conditions and the NMS parameters then existing at that node.

The volume of such FRR traffic on a VCP is a function of the number of T-slot types on the VCP and the number of channels per T-slot. Table V below illustrates two exemplary VCP traffic profiles and the corresponding amount of FRR traffic generated thereby (in number of composite data frames per FRR control frame).

TABLE V[6,7]

Example 1:
VCP traffic = 10 PCM voice connections
Result: avg time between reconfigurations = 6 secs = 1 per 6,000 data frames
(steady state requires avg turnover of 5 callers every 60 secs)
composite data frame payload size = 80 bytes
(ten 8-byte channels)

Example 2:
VCP traffic = 5 facsimile connections and 10 E-mail connections
Result: avg time between reconfigurations = 4 secs = 1 per 4,000 data frames

[6]Following assumptions apply:
each call requires two configurations (channel request/release)
network frame launch period = 1 ms
PCM voice average call duration = 120 seconds
Fax call duration = 60 seconds
E-mail call duration = 240 seconds

[7]Examples given are for steady state traffic loads. Manner in which loads are achieved is irrelevant to illustrating frequency of composite data frame reconfiguration. (steady state requires avg turnover of 5 fax and 2.5 E-mail callers every 60 secs)

In processing an FRR request rejection (call blocking), the SPU is given the capability to reroute the requested channel or bandwidth on the existing VCP by means of a routing algorithm, or to request that a new VCP be established by the local anchor EFPS, in the same way as discussed above.

Each node on a VCP (both the anchoring EFPSs and the TFPSs on the VCP) individually makes a determination of whether to grant an incoming FRR. This is accomplished by analysis at the respective node of (i) the current bandwidth usage profile of the local output trunk line; (ii) the values of the NMS bandwidth configuration parameters; and (iii) the requested redistribution of bandwidth. Such analysis is performed only in response to an FRR requesting additional bandwidth, i.e., a T-slot channel request. Because principles of bandwidth conservation and maximum utilization are paramount in the system, FRR requests to release bandwidth, i.e., T-slot channel releases, are responded to by an automatic grant of the FRR.

The bandwidth allocation rule (algorithm) utilized in the presently preferred embodiment of the system and method of the invention are as follows:

A request for bandwidth is granted to an SPU only if each node on the VCP "agrees to it". Thus, both of the VCP anchor EFPSs and all of the TFPSs along the VCP have the ability to block the request.

A VCP node will grant a request for bandwidth if the local output link of the VCP meets the following criteria/algorithm[8]:
1) total BW in use < maximum utilization threshold;
2) requested T-slot type BW usage < max allowable BW usage for this T-slot type; and 3) requested T-slot type current BW usage < min guaranteed BW for this T-slot type, or total reserved BW on link < requested T-slot type call block threshold.

*The algorithm uses NMS transmission link specific parameters, discussed above. It should be observed that the bandwidth rules are based on the link profile which is an aggregate of all VCPs traversing the link—in contrast to bandwidth requests from an SPU, which are VCP specific.

Figure 9:
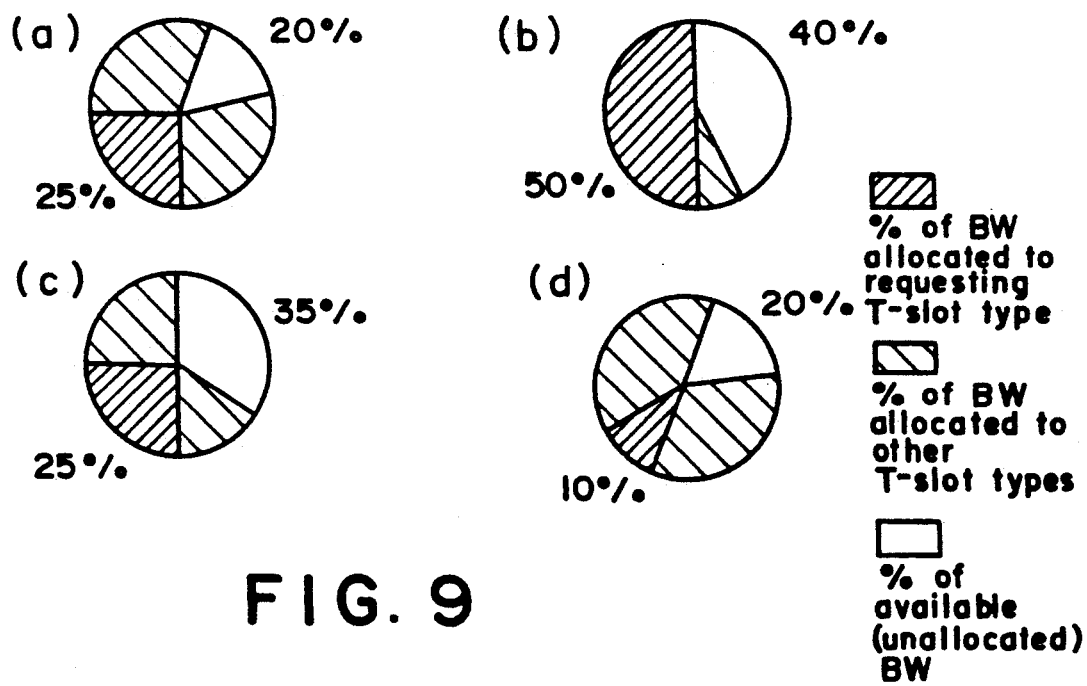
FIG. 9 is a set of exemplary charts illustrating the disposition of bandwidth allocation requests (FRRs) under various traffic conditions, i.e., BW grant/reject scenarios.

FIG. 9 illustrates examples of bandwidth allocation requests (FRRs) under various traffic conditions, i.e., BW grant/reject scenarios. Assumptions used for each case are as follows:

| The link threshold utilization table is: | |
|---|---|
| level | threshold |
| 1 | 50% |
| 2 | 65% |
| 3 | 80% |

The link specific parameters for the T-slot type of the channel requested are:

minimum guaranteed BW = 20%
maximum allowable BW = 50%
call block threshold level = 2 (65%)

In each of the four scenarios of FIG. 9, the incoming FRR is a request for additional bandwidth on a link of the VCP for the node addressing the request. In the case represented by FIG. 9(a), the FRR is rejected by the node because the maximum link utilization threshold is 80% (this "threshold" is the measurement of actual bit usage as a percentage of link bit rate, or current bandwidth used), and here, only 20% of the available (unallocated) BW remains on the link. Hence, the link utilization is currently at the maximum threshold (for this link), and in that situation no T-slot requests are granted if to do so would cause the minimum guaranteed bandwidth to be exceeded for the requesting T-slot type. Here, the minimum guaranteed BW for the latter is 20%, and the percentage of BW allocated to channels of the latter is 25%. Therefore, the request is rejected (denied), even though the current allocated BW is less than the maximum allowable BW for the requesting T-slot type.

In the situation represented by FIG. 9(b), the FRR is rejected because the requesting T-slot type has already reached its maximum allowable BW (50%). In FIG. 9(c), the FRR is rejected because the current BW usage on the link is at the call block threshold level (measurement of total BW in use by all T-slot types on the link, here 65%, and which is the same as the link utilization threshold level), and the requesting T-slot type has already exceeded its minimum guaranteed BW.

In the scenario of FIG. 9(d), the FRR is granted by the node. Here, even though the link is at its maximum utilization threshold (80%), the requesting T-slot type is below its minimum guaranteed BW (10% versus 20%). Since the other 70% of BW up to the maximum utilization threshold is currently allocated to channels of other T-slot types, bandwidth seizing (to be discussed in greater detail presently herein) will be triggered.

The bandwidth allocation in response to FRRs has an impact on other T-slot types. That is, when channel requests for a "dormant" T-slot type begin increasing (up to its minimum guaranteed BW), the total link activity level may push other T-slot types, which are highly active, over their call block threshold. In that case, call blocking will be initiated on those other T-slot types, even though their respective activity levels on the link is not increasing. Call blocking will continue until the reserved BW of the other T-slot types falls to their respective minimum guaranteed BW levels. Call blocking (and BW seizing) will, however, take T-slot type priority level (gleaned from the PFC field) into account, so that the T-slot types of lower priority are "bumped" from their excess BW before the T-slot types of higher priority.

Table VI below illustrates subscriber traffic throttling techniques for composite data frame bandwidth management on trunk lines (links), and the relationship between call blocking and other traffic throttling techniques.

TABLE VI

| Throttling | Scope | Impact |
|---|---|---|
| 1) call blocking | per T-slot basis -- at T-slot specific link utilization level (prioritized) | no new connections granted quality of service to existing connections not affected |
| 2) BW seizing | per T-slot basis -- at max link utilization level only (prioritized) | call blocking quality of service to existing calls is degraded no data dropped by network |
| 3) frame discard | indiscriminant (all T-slot types) occurs during link transmit queue congestion | call blocking, all T-slots data is discarded without consideration of T-slot type or priority |

The bandwidth seizing process is implemented according to the following algorithm. A given T-slot type channel will be allocated on a VCP at the expense of seizing bandwidth from other T-slot types if:

(1) BW reserved for the requesting T-slot type < minimum guaranteed BW for this T-slot type; and (2) link utilization level is at or above the maximum threshold.

The NMS transmission link specific parameters may be configured so that when two or more T-slot types exceed their minimum guaranteed bandwidth, one can continue requesting more bandwidth at the expense of triggering call blocking on the other T-slot type(s). This is achievable by setting that T-slot's threshold and maximum allowable BW to higher values. However, an FRR by one T-slot type will not be granted at the expense of bandwidth seizing unless the requesting T-slot type is below its minimum guaranteed BW level. This rule is implemented in the system of the invention because bandwidth seizing results in degraded service for already established connections.

The present invention utilizes a technique of frame compression for building and formatting the composite data frames, which, together with BW seizing, represents a difference in kind from the bandwidth contention technique taught by the '886 Patent and from other schemes taught by the prior art. For example, rather than having each burst on a subscriber connection contend for one of the statically allocated channels within the packet payload, according to this aspect of the invention any unused bandwidth is compressed completely out of the frame being launched. If a subscriber connection has data to send, it can fill its respective T-slot channel(s) on the next outgoing composite data frame being built for launching on the VCP. However, if the subscriber connection has no data to send at the time the frame is being composed, the local anchor EFPS simply compresses the frame by completely removing that channel.

This frame compression scheme unlocks bandwidth consumed by empty or partially empty payloads inherent in fixed size payload protocols such as ATM. The ISN network of the present invention utilizes a hybrid protocol in that the composite data frames are of variable rather than fixed length, but the channels within the frame are of fixed size on a per T-slot type basis. Locked bandwidth cannot be used for transporting subscriber data, nor is it even available to the subscriber data stream. It consists of (i) bandwidth consumed by framing overhead (header and trailer), (ii) a partially empty frame payload, (iii) transmission link control signalling, and (iv) network control signalling. The relatively small channel sizes in the composite data frame of the invention, compared to the prior art ISDN and ATM schemes, minimize fixed size payload utilization sensitivity to traffic characteristics (e.g., burst/block size and frequency). The frame compression technique and the structure of the composite frame tend to drive the ratio of effective bandwidth utilization (EBW), i.e., the percentage of BW consumed by the subscriber data stream, to actual bandwidth utilization (ABW), i.e., the sum of the percentage of BW consumed by the subscriber data stream plus the percentage of locked bandwidth, toward the ideal ratio of EBW/ABW=1.

Frame compression eliminates two causes of partially empty payloads, viz., (1) an empty channel attributable to the subscriber having been idle during the last frame launch period, and/or (2) the T-slot type for the channel in question is undergoing flow control on this VCP. The scheme results in omission of empty channels from the composite data frames; in effect, the frame is "collapsed" before it is launched. Neither additional control signalling between nodes on the VCP nor frame reconfiguration is required for frame compression.

In performing the preferred method of frame compression, no space is allocated for a channel by the VCP anchor EFPS during frame composition unless the associated SPU has posted a cell as being ready for transmission. In this context, "cell" refers to a unit of subscriber data that the SPU places in a predefined memory location ("bucket") which is checked by the anchor EFPS during the next frame launch. That cell will be included by the EFPS in the next frame if the SPU has posted (flagged) it as being ready. The size of the cell is equal to the size of the channel for the T-slot (traffic component) type of the particular subscriber. If a partial cell is posted, the EFPS will include and launch it in the next data frame, resulting in a partially filled channel. However, depending on the traffic characteristics of the particular traffic component type, such as delay insensitivity, the SPU may elect not to post a partial cell in the expectation that it may be filled during the next frame launch period.

If the SPU has not posted a cell for a particular subscriber, the anchor EFPS notes the absence of a flag for the bucket and sets the PFC field bit associated with the channel allocated to that subscriber (the respective "C" bit) to "not present" (i.e., C=0). In an alternative embodiment and method, if a specific T-slot type were not required to have "per channel" PFC bits (i.e., C bits), so that frame compression were not performed on a per channel basis, it would be performed on the basis that either all of the channels are present or none is present, as indicated by the "per T-slot" presence bit (i.e., the "B" bit) in the PFC field. In this respect, it should be noted that for T-slot types with very small channels and/or highly active subscribers, per channel frame compression is less effective from a bandwidth or processing standpoint than with larger sized channels or where the subscriber is somewhat less active.

Figure 10:
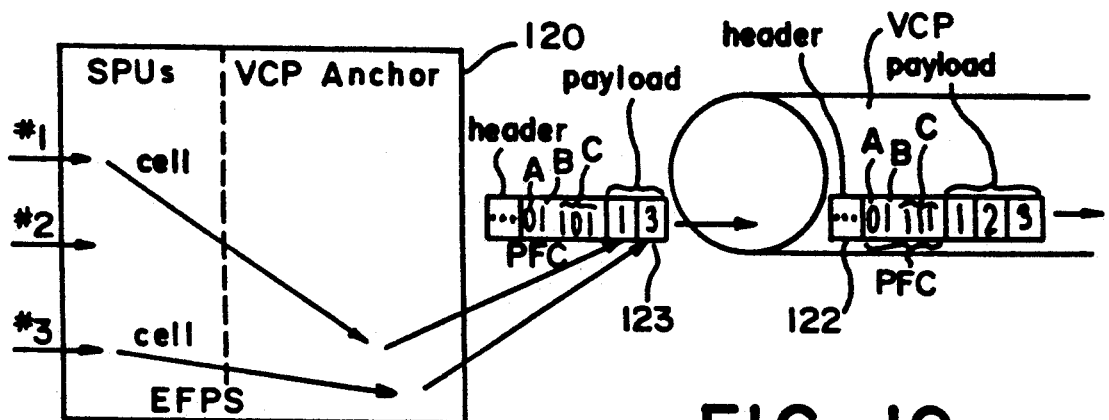
FIG. 10 is a simplified diagram of a VCP anchor EFPS illustrating the launching of composite data frames utilizing the preferred frame compression method of the invention.

FIG. 10 is a simplified diagram of a VCP anchor EFPS illustrating the launching of composite data frames utilizing the frame compression method of the invention. EFPS 120 is the local VCP anchor, which built and launched composite data frame 122 in the immediately previous frame launch period. In its header, frame 122 has a PFC field which includes, for one of the frame's T-slots, an A bit=0 (indicating no flow control), the B bit=1 (indicating presence of the associated T-slot), and a sequence of C bits all of which=1 (indicating presence of each of the three channels in the payload of the frame for that T-slot). For the frame 123 being composed during the current frame launch period, however, the SPUs of EFPS 120 have posted cells for only subscribers (channels) 1 and 3 of this T-slot. Consequently, this frame is compressed without a channel 2 as indicated by C=0 in the PFC field for this T-slot.

The anchor EFPS at the remote side of the VCP receives each composite data frame, such as 123, transported on the VCP, and interprets the payload format during frame decomposition by comparing the delta change in the PFC field of the incoming frame relative to the frame format template which was received and stored during the last frame reconfiguration. In the situation represented by FIG. 10, the remote EFPS thereby recognizes the absence of channel 2 of the first T-slot in frame 123.

In the architecture of the preferred embodiment of the multimedia transmission system according to the invention, a frame is sent even if no data is being transmitted in its T-slots. This not only informs the remote side EFPS that no channels are active, but also serves the purpose of maintaining the synchronous frame launch aspect of the invention. Otherwise, it would be necessary to dispatch time stamps to indicate the particular time that each frame is launched, to keep track of individual frames in the network for use in the frame decomposition process at the remote anchor EFPS. Synchronous launching of the frames at predetermined equal intervals of time throughout the network eliminates the need to send such additional information regarding timing. Each node that receives a frame (whether TFPS or remote EFPS) recognizes that the preceding packet was sent one millisecond (or whatever other synchronous frame launch interval is used) before the current one.

Frame compression is a core building block of the bandwidth seizing technique. In essence, the latter is a flow control technique which is sensitive to the NMS assigned T-slot priorities, and to the unique traffic characteristics (such as delay, data loss, packet jitter, etc.) of each traffic component type. As previously observed herein, bandwidth seizing is used during high link utilization periods to temporarily reallocate reserved bandwidth from a T-slot type exceeding its maximum guaranteed bandwidth to a T-slot type which is below its minimum guaranteed level and is requesting additional bandwidth, or to provide basic flow control of all traffic components. It allows maximum bandwidth sharing and allocation, as a percentage of total link capacity, without increasing the risks of call blocking and/or unacceptable degradation of service quality.

The bandwidth seizing technique of the invention requires no additional bandwidth for its initiation, in contrast, for example, to the flow control technique utilized in an X.25 network which requires a "received—not ready" (RNR) control packet (with its additional BW overhead) to be sent to initiate flow control. Furthermore, frame reconfiguration is not required, but frame compression is automatically triggered when the SPUs reduce traffic onto the network by not posting cells during frame composition. As illustrated by the traffic throttling techniques of Table VI above, bandwidth seizing is a more "drastic" throttling technique than call blocking, but less "drastic" than frame discard.

In processing the composite data frame on a VCP, each TFPS initiates flow control when an associated link's transmit queue size crosses a predefined link utilization threshold level indicative of congestion. This situation may arise either when (i) a new channel request is made by a T-slot type which is below its minimum guaranteed BW level, or (ii) a statistical aberration occurs in which an unusually large number of already allocated channels on each VCP are simultaneously sending data (i.e., all SPUs are posting cells for each frame launch). It will be understood, of course, that although packet switching is a statistical multiplexing approach which assumes certain averages, and not peak usage, nevertheless, peaks do occur.

When flow control is called for, it is initiated on T-slots exceeding their minimum guaranteed BW, starting with T-slots of the lowest priority. For each composite data frame in the receive queue on the congested link of the affected TFPS, the TFPS sets the A bits to 1 (indicative of flow control requirement) in the PFC field corresponding to the affected T-slot types. At the EFPS(s) that receives frames with this modified PFC field, the response is to implement bandwidth seizing, in the manner illustrated by the sequence of parts (a), (b), (c) and (d) of FIG. 11.

Figure 11A:
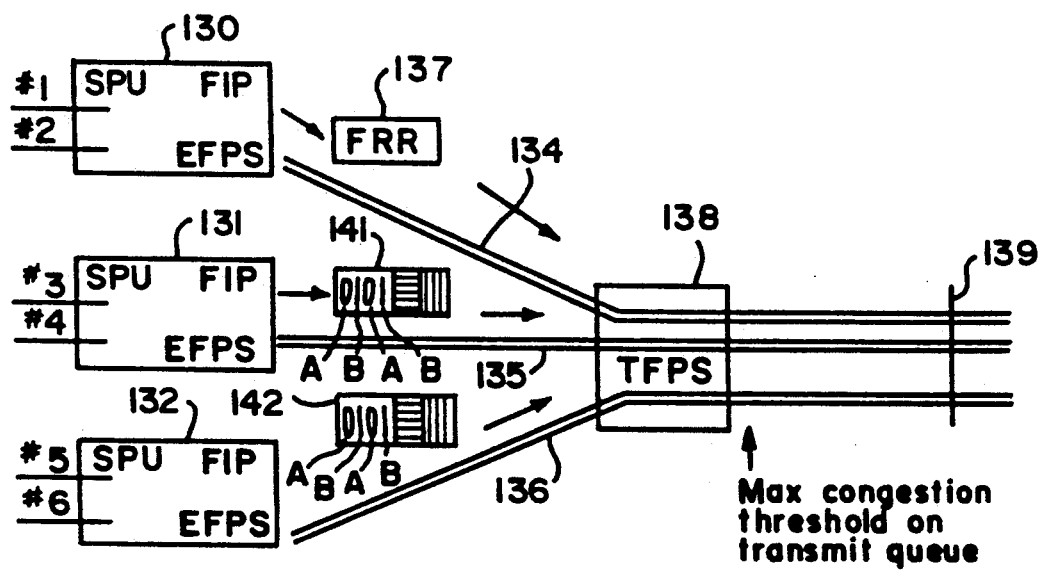
FIG. 11(a)-(d) are sequences of frame processing diagrams illustrative of the initiation of flow control through bandwidth seizing according to the invention.

Referring to FIG. 11(a), anchor EFPSs 130, 131 and 132 for three different VCPs 134, 135 and 136, respectively, build and launch composite data frames onto the respective VCPs during each frame launch period. An SPU associated with each EFPS posts cells from each subscriber data stream to be composed within channels of the respective T-slot type in the composite data frame for launching onto the respective VCP. In this example, all three of the VCPs traverse transit node (TFPS) 138. Each of the EFPSs has two subscribers (numbered 1 through 6, respectively) providing data streams of different traffic component types. The PFC bits (only A and B are shown here, for the sake of simplicity and because the individual channel bits are not used for this activity) in the headers of the data frames 141, 142 launched by EFPSs 131 and 132 respectively, indicate the presence of two T-slot types each (both B bits=1) and no flow control for either (both A bits=0). (Also for simplicity's sake, individual channel information is not shown for the two T-slots in each of those payloads).

An FRR control frame 137 is issued by EFPS 130 requesting additional bandwidth for a T-slot type which is below its minimum guaranteed BW level at the congested link 139, which carries all three VCPs at the other side of TFPS 138. Link 139 has reached the maximum utilization threshold level on the transmit queue from the TFPS. Also, the T-slot types in the incoming frames 141, 142 from EFPSs 131 and 132 are currently exceeding their respective minimum guaranteed BWs. Under these conditions, bandwidth seizing from those T-slot types is required. According to this aspect of the invention, those T-slot types which exceed their minimum guaranteed bandwidth, and which are at a lower transmission priority level (assigned priority ranking, as discussed above) than the traffic component which is requesting more bandwidth, will have bandwidth seized from them.

Figure 11B:
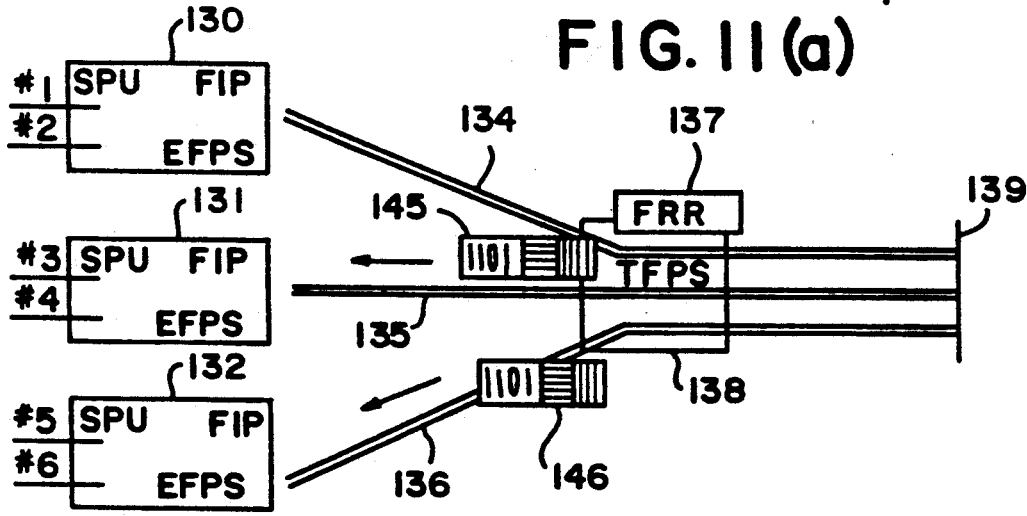

In FIG. 11(b), the VCP anchor EFPSs are notified of the need for bandwidth seizing. TFPS 138 (and any other transit node having a congested link—maximum link utilization—and experiencing the same conditions) responds to the conditions of FIG. 11(a) by setting the A (flow control) bit in the PFC field(s) of the affected T-slot(s) (i.e., those of lower priority and from which BW is to be seized) to 1, in frames (e.g., 145, 146) in the receive queue at that TFPS destined toward the VCP anchor EFPSs which are generating the excessive traffic (EFPSs 131, 132 in this example), thereby requesting flow control. Only the PFC flow control bit associated with the first T-slot in each of frames 145 and 146 has been so modified, in this example. All composite data frames in the receive queue for this TFPS are affected, without regard to which of the three VCPs they are associated with. These are data frames which were launched from the remote side anchor EFPS of the respective VCP. EFPS 130, which issued the pending reconfiguration request (FRR control frame 137) will continue to launch composite data frames with the previous format for the entire period that the FRR is pending.

Figure 11C:
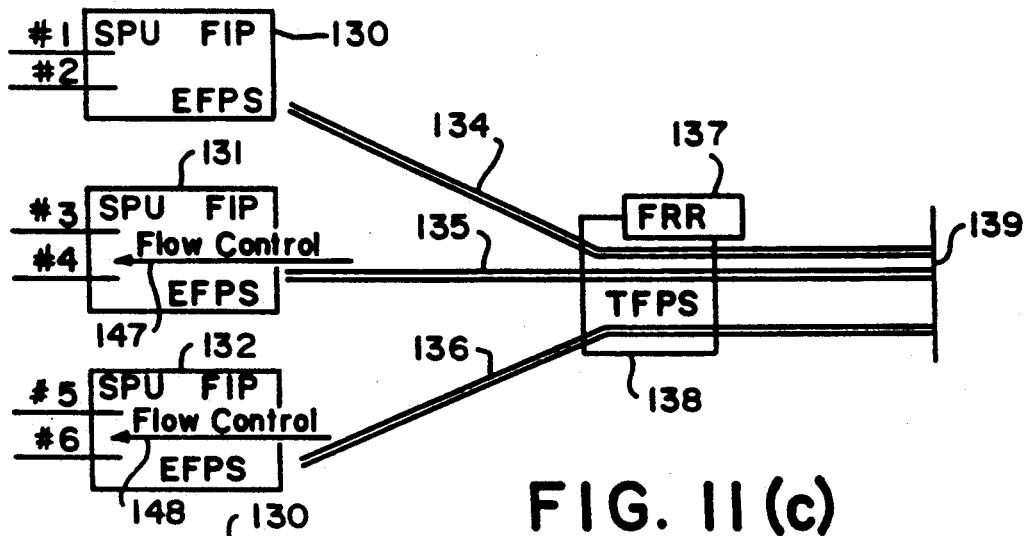

In FIG. 11(c), during decomposition of the received frames at EFPSs 131, 132, the flow control indication for the affected T-slots (one on each VCP in this example) is detected from the associated A bits in the frame headers. As a result, the fast packet internal protocol (FIP) subsystems in these EFPSs dispatch flow control command cells (indicated at 147, 148) to their respective SPUs to perform less frequent posting of cells for building and launching the composite data frames by their respective EFPSs. During this time, the congestion has not yet been alleviated on the transmit queue at TFPS 138 for link 139.

Figure 11D:
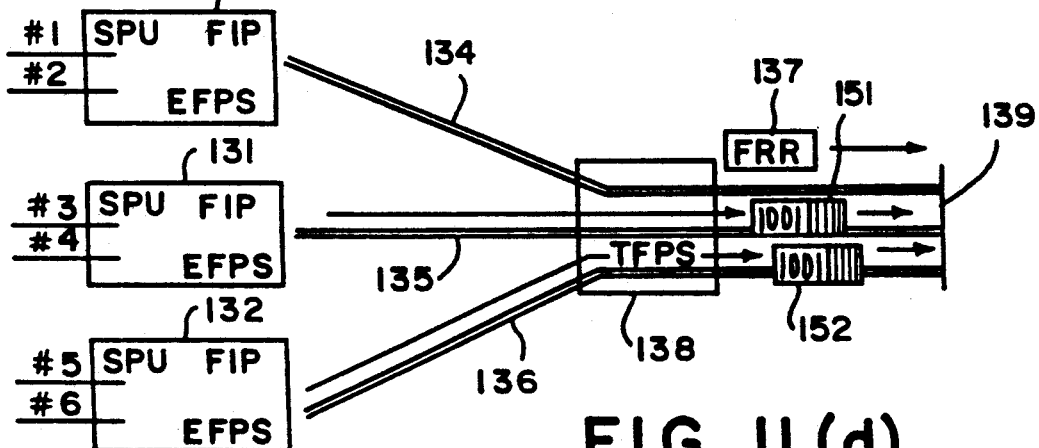

In FIG. 11(d), frame compression is implemented to free up bandwidth (by seizing it) from the T-slots affected by the flow control request. The less frequent posting of cells by the affected SPUs results in frame compression by eliminating some or all channels of the affected T-slot type(s) in some of the composite data frames. To that end, the algorithm utilized for the purpose may be customized on a per T-slot basis—for example, to use voice clipping techniques for discarding portions of the data stream of a voice traffic component subscriber, and to permit sending an RNR control packet by an X.25 data traffic component subscriber because of its lower tolerance of data loss but greater tolerance of delay than the voice traffic component. It is not necessary that the transit node be cognizant of the method used at the EFPSs to relinquish bandwidth as part of the BW seizing process, and consequently, the ISN network design is simplified. That is, for example, a new traffic component type may be introduced into the network without requiring redesign of the internal/transit network.

The freed bandwidth or a portion thereof is thereby reallocated (i.e., redistributed), and the FRR 137 which has been held by TFPS 138 is dispatched to the next transit node along the VCP(s) once the traffic profile indicates that TFPS 138 (or more accurately, its associated link of interest) is no longer congested. Composite data frames 151 and 152 launched by EFPSs 131 and 132, respectively, have flow control bits set and T-slot non-present bits in the portion of the PFC field associated with the first T-slot of the data frame, attributable to the flow control/frame compression. Although link 139 may remain at the maximum congestion threshold for a period after BW seizing is implemented, the T-slot type distribution will have changed as a result of the flow control and redistribution of bandwidth to relieve the congestion in relatively short order.

A VCP template is stored at each TFPS (and at the EFPS anchors) to describe the composite data frame format of each VCP that traverses the link(s) on which this transit node is located. The TFPS also stores the above-described T-slot type profile table, which specifies, among other things, the priority level of each traffic component type supported by the ISN network. This information allows the transit node to readily determine whether a traffic component type requesting additional bandwidth is of higher or lower priority than other T-slot types on the VCPs traversing the associated link, their respective minimum guaranteed and maximum allowable bandwidths, the state of congestion and maximum utilization of the link, and accordingly, whether or not bandwidth seizing should be invoked for flow control of one or more of the traffic components. If needed, bandwidth seizing is performed simply by changing a bit value in the PFC field to adjust the traffic flow of selected T-slot types.

Although bandwidth seizing is initiated by the transit node at the point of traffic congestion, the reduction in bandwidth usage is handled at the VCP anchor points by the T-slot-specific SPU subsystems for as long as the transit node continues to require the bandwidth seizing. Bandwidth reduction is the same percentage of maximum or targeted bandwidth for each of the respective traffic component types. For example, a 64 kb PCM voice channel which is reduced, because of BW seizing, by 50% will produce a maximum reduction of 32 kb/sec. A suitable algorithm for that purpose would change the posting of a cell by the respective SPU from an 8-byte channel every 1 ms to an 8-byte channel every 2 ms, using ADPCM techniques to compress the voice.

If the transit node determines that bandwidth on a given link is to be seized from one or more other traffic components types, the TFPS periodically examines a data frame in its receive queue for T-slots being flow controlled, and sets the PFC flow control bit to maintain BW seizing. When the link profile template indicates that BW seizing is no longer needed, this periodic examination of packets is ceased. The SPUs may be commanded to continue flow control at their respective EFPSs (by the process of less frequent posting of cells for the building of the composite data frames) until no "refresh" (i.e., no PFC bit requiring flow control) is encountered in decomposition of a received frame for a predefined time period N.

The bandwidth seizing scheme of the invention is especially effective when used in conjunction with a networkwide synchronous frame launch time. A one millisecond launch interval, for example, provides excellent bandwidth utilization and short packetization delay. Because bandwidth seizing granularity measured in seconds (typically, 15 to 30 seconds, versus a 1 ms frame launch interval) is four orders of magnitude slower than frames launched on each VCP, the transit node need not be precise about setting the PFC field and yet will still assure total control of bandwidth seizing. Indeed, the transit node may be somewhat imprecise and inconsistent with setting PFC bits in one or more frames associated with each VCP traversing the affected link within a time period N, without adversely affecting such control. For example, assuming a 1 ms frame launch interval, and that the SPU exercises flow control for 10 seconds after the last bit requirement for same is received, an algorithm which provides that at least one packet in 10,000 packets per VCP has bandwidth seizing set in the PFC field will assure maintenance of bandwidth seizing on the link. Thus, despite imprecision, the technique provides reliable results and rapid reaction/initiation. With an average nodal delay of one ms and an average hop count (i.e., the number of nodes traversed by a VCP) of six per VCP, and a one ms launch interval, bandwidth can be seized and reallocated in less than six milliseconds. This excludes the propagation delay of the particular network transmission medium, which, for example, is the speed of light for a fiber optic network.

This form of communication via the PFC field is not a link protocol, but a network layer protocol. Any TFPS or remote EFPS may use it to notify the source anchor EFPS of bandwidth seizing. Many variations may be employed of the amount of bandwidth to be relinquished. A simple and straightforward approach is to employ a fixed percentage reduction of traffic at each interface—for example, 25%. Another approach is to progressively reduce the traffic when bandwidth seizing is initiated and while it is in effect, and then progressively allow more traffic when BW seizing is ceased. Still another approach is based on the frequency, i.e., the percentage of data packets, in which the PFC field flow control (here, BW seizing) indication is set. Again, the communication and maintenance of bandwidth seizing requires only a small percentage of packets (one in every 10,000 to 30,000 packets would suffice) to carry the indication.

Figure 12:
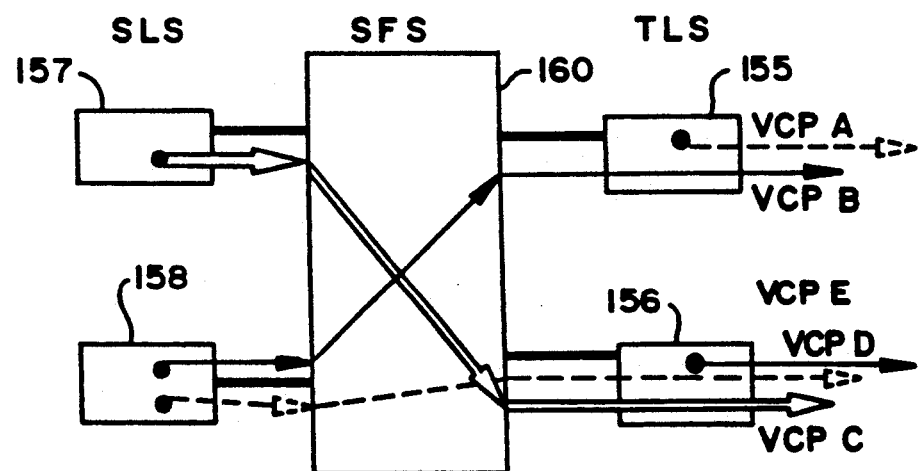
FIG. 12 is a block diagram illustrating the technique for anchoring a VCP in an EFPS.

The TLS associated with the anchoring EFP is adapted to store a VCP profile table for each VCP anchored on that EFPS. FIG. 12 illustrates the manner in which the VCP may be anchored in the EFPS. The VCP profile table to be stored preferably includes the following information: (1) the address of the remote side EFPS which anchors this VCP; (2) the location of the local VCP anchor (which may be either at a TLS or an SLS); (3) the number of subscriber VCs and their respective bandwidth requirements on the VCP (in composite data frame environment, number of channels and T-slot type); and (4) the number of other VCPs anchored on this EFPS which are also anchored on the same remote EFPS (note that two EFPSs may have more than one VCP connecting them simultaneously, because of heavy traffic between those two points). For each of the latter VCPs, information is also kept regarding the number of channels and the T-slot type of the channels.

In FIG. 12, VCPs A and B are routed through TLS 155. VCP A is TLS-anchored (to TLS 155), and VCP B is SLS-anchored (to SLS 158). VCPs C, D and E are routed through TLS 156. VCPs C and E are SLS-anchored (at SLSs 157 and 158, respectively), and VCP D is TLS-anchored (at TLS 156). The anchoring to the SLSs is through the switching fabric 160. As observed in the description pertaining to FIG. 2 above, the decision of whether to anchor a VCP on an SLS or a TLS is based on the traffic patterns between the source and destinations EFPSs. The general guidelines for arriving at this decision are as follows. First, a VCP anchor only multiplexes VCs that terminate on the same EFPS as the anchor. Second, all TLSs and SLSs include full fast packet internal protocol functionality, and therefore can anchor a VCP. Third, a subscriber data stream should not pass through the switch fabric more than once. (An exception is local switching, because the source and destination anchors are on the same EFPS).

The choice of whether to have multiple parallel VCPs between a local EFPS and a remote EFPS, and of where to locate the VCP anchor(s) (on a TLS or an SLS), is also driven by the opportunity to mutiplex (OTM) onto the VCP. A VCP is anchored on TLSs when there is OTM subscriber data streams (VCs) originating on different SLSs (such as for VCP A and VCP D in FIG. 12, where subscriber data streams from both SLSs 157 and 158 may be multiplexed onto either VCP). This results in larger payload to header ratios, while minimizing each subscriber's packetization delay. A VCP is anchored on an SLS when there is no OTM the VCs originating on this SLS with VCs originating on another SLS, either because it is not possible or not economical to do so. It is not economical to multiplex VCs originating on different SLSs for either of the following reasons:

- payload/header ratio is so small that it is not justifiable to burden the performance oriented TLS with endpoint switching activities for this VCP;
- a VCP channel is so large (e.g., 750 kbps video) that multiplexing with other VCs is not necessary to assure low packetization delay a good payload/header ratio.

When a VCP is anchored on an SLS, the performance oriented TLS is only required to perform transit switching activities for composite data frames or control frames associated with the VCP. Endpoint processing to transit processing ratio may, for example, be in the 4:1 to 8:1 ratio.

OTM onto a VCP is a function of (i) the number of subscriber VCs going to the same remote EFPS (i.e., the number of channels), (ii) the amount of dispersement of channels over SLSs (e.g., whether all candidate VCs originate on one SLS, or on different SLSs), and (iii) the amount of bandwidth requested by the subscriber VCs (i.e., the size of T-slot type channels in the present architecture). An SLS based VCP preferably only multiplexes VCs originating on that SLS. Otherwise, as noted above, the EFPS performance is degraded because subscriber data must pass through the system switching fabric twice: once from the originating SLS to the SLS where the VCP anchor is located, and once more when the data is framed and sent to the TLS for transmission onto the trunk line toward the remote EFPS. This constitutes unacceptable overhead for the system.

A TLS anchor has the benefit of capability to multiplex onto one VCP the different subscriber connections from multiple SLSs, thus optimizing trunk line and transit node effectiveness; and the drawback of added overhead/complexity of SLS/TLS communication. An SLS anchor has the benefits that, (1) for VCPs with subscriber connections originating on the same SLS (i.e., only one SLS needs the VCP), it eliminates the overhead of TLS—SLS synchronization when the TLS has no OTM, and (2) for super-rate channels (i.e., one channel per VCP), there is again no OTM.

In the local switching example of FIG. 13, the "VCP anchors" are at SLSs 168 and 169 of EFPS 170, and do not require full processing. The subscriber data streams are exchanged by the SLSs using cells, without ever requiring composition or decomposition of composite data frames, keep VCP state information (templates), or many other requirements of the normal VCP processing/transmission. Clearly, this is a special case, but one worth mentioning. Both SLSs view the logical VCP as at the other side of the TLSs 171, 172 of EFPS 170, with both SLSs performing processing as though their subscriber data is controlled by a TLS based VCP.

The long term nature of VCPs and the inherent lack of tight coupling with current subscriber traffic (VCs) requires a periodic reevaluation of optimal VCP anchor location and VC loading (i.e., number of VCs multiplexed). As network traffic conditions change over time, the present invention allows relocation of the VCP anchor to the optimal location for those conditions. An EFPS is able to reroute VCPs, relocate VCP anchors, consolidate VCP anchors, and subdivide a VCP.

The purposes of automated VCP location will be further clarified by the following examples. As the VC load increases between an EFPS pair, multiple SLS anchored VCPs will be consolidated into a single TLS based VCP which uses the network-wide frame launch period. On the other hand, a TLS anchored VCP may be converted to an SLS anchored VCP (and even subdivided into several SLS anchored VCPs) when the VCP traffic load drops to a level that the payload/header size is unacceptably small in the network-wide frame launch period environment. An existing VCP may be rerouted/reconnected if the existing route is suboptimal because of network topology or traffic conditions at the time the route was established. It should be noted that, unlike other causes of VCP relocation, VCP rerouting may be attributable to network conditions unrelated to local subscriber traffic changes.

With respect to changing network traffic conditions which justify relocation of a VCP anchor, if it were assumed, for example, that the threshold for the function (designated $\theta$) representing OTM onto a VCP is a constant value (designated $\phi$) the conditions for VCP anchoring on the TLS or the SLS may be presented as follows:

$\theta < \phi$ $\theta > \phi$

Particular values for $\phi$ are to be defined for each individual implementation case. FIG. 14 illustrates a hypothetical case of the anchoring process in real time. The VCP should be anchored on the TLS as soon as $\theta$ crosses and exceeds $\phi$, and should be anchored on the SLS when $\theta$ falls below $\phi$. According to an aspect of the invention, either of two basic approaches may be used to trigger anchor relocation, viz.: (1) relocation on demand, and (2) periodic relocation.

In the relocation on demand approach, anchor location is reevaluated during each VC call request from a subscriber. After receiving the call request, the SLS retrieves descriptors S, R and C and makes a routing decision defining a fourth descriptor T. R is the address of the remote EFPS which anchors this VCP; S and T represent the SLS and TLS (one or the other), respectively, for the location of the local VCP anchor; and C represents the number of channels for a given T-slot type. These constitute the four descriptors of the VC/channel. At the request of the SLS, the TLS checks the anchoring conditions and reports its decision back to the SLS, namely, either (i) open a new or join the existing VCP with the TLS anchor or (ii) open a new or join the existing VCP with the SLS anchor. This decision is based on the state of the value of $\theta$ relative to the threshold level $\phi$ illustrated in FIG. 14. (The activity/decision can also trigger VCP consolidation/fragmentation as shown in the flow diagrams of FIGS. 15 and 16, described below).

In the periodic relocation approach, the relocation occurs on a fixed time interval or time of day basis. A principal purpose of this approach or mode is to correct suboptimal anchoring. Corrections must be made because the number of active channels can change over time regardless of the arrival rate of call requests. Assume, for example, that a call clear on one VC results in a value of $\theta$ which is below $\phi$ (FIG. 14), and that this conditions prevails for a relatively long time interval. Periodic relocation corrects this situation by re-anchoring the corresponding VCP from the TLS to the SLS. The accuracy of the process depends upon a fixed time interval (or fixed time of day) for the relocation. A trade off between frequency of relocation and accuracy of the process should be made for each individual implementation/network. Unlike relocation on demand, the periodic relocation mode, in which the relative values of $\theta$ and $\phi$ (i.e., $\theta/\phi$) are periodically analyzed, reduces the possibility of thrashing between anchor locations.

Figure 15:
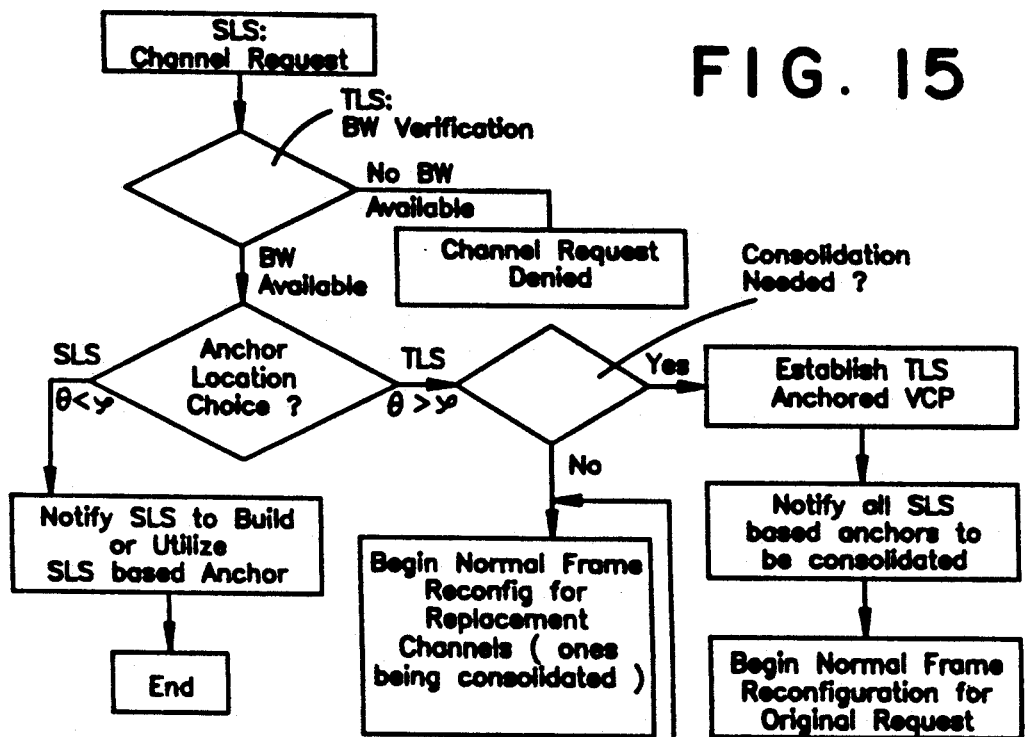
FIGS. 15 and 16 are flow charts indicative of the processing required for adaptive anchoring of VCPs with relocation on request for a channel and release of a channel, respectively.
Figure 16:
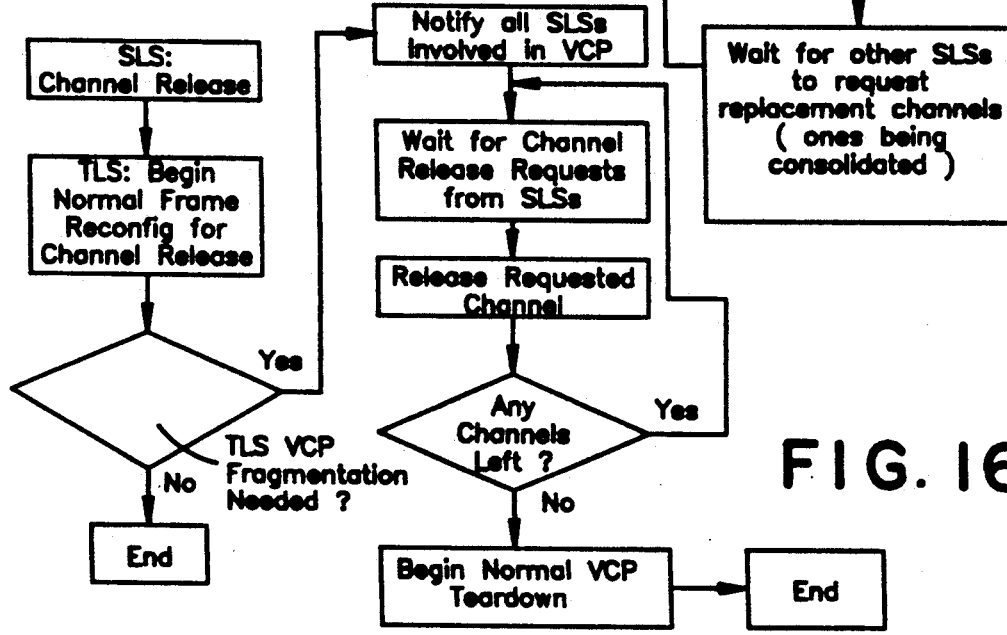

The processing logic is illustrated in flow chart form in FIGS. 15 and 16. Referring to FIG. 15, which is a simplified example of adaptive anchoring showing relocation on channel request, the SLS receives a call request from a subscriber and retrieves the descriptors S, R and C, and then makes a routing decision defining the TLS number T. The SLS then sends the channel request to the chosen TLS. The TLS performs bandwidth verification, and if no bandwidth is available the channel request is denied. However, if bandwidth is available, the anchor location choice of SLS or TLS is based on the value of $\theta$ relative to $\phi$. If, as a result, the SLS location is selected, the SLS is notified to build or to utilize an SLS based anchor. If the TLS location is selected, a decision is made as to whether consolidation is required. If not, normal Frame Reconfiguration is begun for replacement channels (those being consolidated). If consolidation is needed, a TLS anchored VCP is established and all SLS based anchors to be consolidated are notified. Then normal Frame Reconfiguration is begun for the original request, and a wait is instituted for other SLSs to request replacement channels (those being consolidated). Thereafter, the same logic path is followed as though no consolidation were needed.

FIG. 16 is a simplified exemplary flow chart for adaptive anchoring with relocation as a result of channel release. The SLS receives a channel release request from a subscriber, and such request is always granted in the interest of making additional bandwidth available. The TLS is notified and begins normal Frame Reconfiguration for channel release. A decision is made of whether VCP fragmentation is needed, and, if so, all SLSs involved in the VCP are notified, a wait is instituted for channel release requests from the SLSs, the requested channel is released, and if no channels are left a normal VCP tear down is begun. If, however, channels are left, the logic reverts to a wait for channel release requests from the SLSs.

Figure 17:
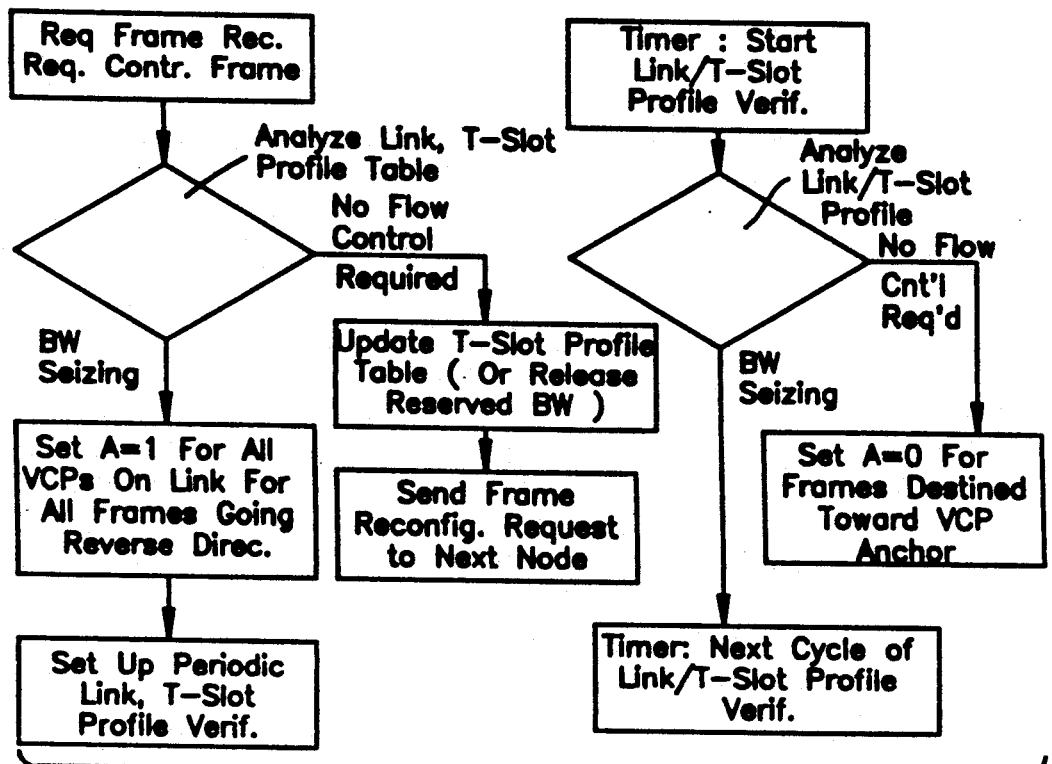
FIG. 17 is a flow chart illustrating the A bit set-up procedure for bandwidth seizing.

Some additional considerations pertinent to BW seizing and flow control will now be discussed with reference to FIGS. 17-19. Referring to the flow chart of FIG. 17, the A bit set-up procedure is performed at the source anchor EFPS or any TFPS on the VCP. The procedure begins when an FRR control frame is received by the particular node. Upon receipt of the FRR, the node analyzes its stored associated link/T-slot profile which is indicative of traffic on the link and specific subscriber activity. If flow control is not required (A=0 in the portion of the PFC field associated with this T-slot), the T-slot profile is updated or the bandwidth reserved for the particular subscriber(s) (channel(s)) is released at the node. The FRR control frame is then sent to the next node along the VCP path.

If, however, flow control is required, bandwidth seizing will be performed at the node. In that event, the A bit in the PFC field is set to 1 for all VCPs (not merely the VCP from which the FRR was received) using the particular link for all frames being transmitted (traveling) in the direction opposite from that of the FRR. Thereafter, periodic link/T-slot profile verification is performed at the node.

According to a feature of the system of the invention, a timer is utilized to determine whether or not flow control should be maintained. Referring again to the flow chart of FIG. 17, at the moment that flow control is set up, the timer is started to require periodic profile verification, meaning that the link/T-slot profile is analyzed periodically at the node. If bandwidth seizing is required, the timer continues into the next cycle. As noted above, any transit node (TFPS) along the VCP can set the A bit (to 1) and thereby turn on the flow control. Network transmission is taking place at very high speed, with a considerable number of frames moving in both directions on any given link and across any given TFPS. Therefore, it would be an undue burden to require the TFPS to determine what the state of the A bit should be in each incoming frame by performing the necessary analysis, and then set or reset flow control for each as required. The result would be thrashing at the node as it analyzes the template and issues the appropriate A bit setting for each T-slot in every frame during traffic congestion, leading to even greater congestion.

To avoid or alleviate that situation, the timer is used to provide a somewhat imprecise but nevertheless simple and effective technique by which to maintain the appropriate state of flow control at the node. This aspect of the invention recognizes that flow control is likely to be needed for more than simply one millisecond (or specifically, the particular interval which has been selected for the network wide synchronous frame launching), and that processing should be minimized at each node to the extent possible. During frame decomposition (in which the packet is taken apart to recover the payload information at the destination side), if flow control had been set for a particular T-slot an assumption is made that flow control is to be maintained for that particular T-slot in every incoming frame on that VCP for a period of time. This period of time is set by the timer. Then, even if no further frames requiring flow control for the T-slot in question are encountered on that VCP, the flow control is nevertheless maintained throughout the timer period. If, before the timer expires, a frame is received on that VCP in which the A bit is set to 1 for that T-slot, the timer is thereupon reset to maintain flow control for another timer period.

For example, if the synchronous frame launch time is selected to dispatch a packet once every millisecond, 1000 packets will be received every second. If the flow control timer is set for a period of one-half second, then 499 packets can be processed on that VCP without a requirement that the A bit must be set on any one. This technique avoids an extremely process-intensive activity at the node, while still maintaining flow control as appropriate. If the timer expires for lack of subsequent receipt by the node, during the timer interval, of another frame in which the A bit is set to 1, then flow control is lifted. The timer technique is forgiving, in the sense that another A bit may be set to 1, if necessary, when time is available to do so at the transit node. But if traffic congestion ceases there is no need to reset a bit, because the flow control will be lifted automatically when the timer expires. Further, the technique does not require more elaborate measures such as counting the number of packets received since the flow control was turned on.

If traffic congestion is occurring at a TFPS of a VCP, the TFPS has the capability to set the A bit to 1 for the congested T-slot in each frame transported on every VCP which traverses the associated trunk (link), and this starts the bandwidth seizing process. Simultaneous with the initiation of bandwidth seizing, the node establishes a periodic link/T-slot profile verification. Referring to the table of FIG. 18, the link/T-slot profile is built based on three parameters, designated alpha, beta and gamma. Alpha represents the total bandwidth (BW) in use on the particular link; beta, the BW usage for the particular T-slot; and gamma, the minimum guaranteed BW for this T-slot type. Alpha is 0 if the total BW in use is less than the maximum utilization threshold; beta is 0 if the T-slot BW usage is less than the maximum allowable usage; and gamma is 0 if the T-slot BW usage is less than the minimum guaranteed BW for this type of T-slot. If the reverse is true for a parameter, then the value of that parameter is 1. The table illustrates the value of the flow control (A) bit for each of several distinct and different situations represented by the value of those three parameters. The situations numbered 2 and 6 in the table are not valid, i.e., cannot exist, and therefore are disregarded.

In those situations requiring active flow control, represented by #s 1, 3, 4 and 5, the TFPS sets the A bit to 1. For example, if situation #1 exists at the node, in which total BW in use is more than the maximum utilization threshold, T-slot BW usage is more than the maximum allowable usage, and T-slot BW usage is more than the minimum guaranteed BW for this T-slot type, the node and its associated links are experiencing severe traffic congestion. Hence, flow control is urgently required. The situation may have arisen from the need to add a new channel (and thus a need for additional bandwidth), as indicated in an FRR received at the node, which triggers BW seizing.

An FRR is communicated in the form of a packet analogous to a call setup packet, and follows the same path as the composite data frames, but constitutes a request to change the format of those frames. The existing format is indicated in a template stored at each of the nodes along the path. Another stored template indicates the amount of change of BW which is permitted for a particular traffic component, i.e., how much of the BW the particular channel may be allocated. Each of the nodes processes the FRR packet, and, if the request for more BW is approved, allocates the additional BW as requested. As noted above, a request for less BW is always approved because of the desirability to have BW available at al times for allocation to other users, without exceeding anticipated reasonable needs in the initial establishment of the transmission facility (network).

If a traffic component A requires additional BW and at that time is not using its minimum guaranteed BW, while at the same time another or other traffic components B, C, D, etc. are exceeding theirs, or the total BW of the transmission facility has already been allocated, then BW must be seized from the other traffic component(s) lacking entitlement and allocated to traffic component A. The FRR can be approved in such circumstances, only if BW seizing can be implemented. If the attempt to de-allocate or seize BW from another traffic component is successful, the call is permitted to be set up in the sense of allocating the additional channel in the frame. Frame compression is employed to reallocate bandwidth, although frame compression may be used to advantage for other purposes as well—such as the previously mentioned subscriber inactivity.

Frame composition and decomposition will now be described based on the B and C presence bits in the PFC field. On the source EFPS anchor side, the template set-up during frame reconfiguration considers the physical capacity across the VCP for each end user connected to that VCP. During frame composition, the anchor node implements the following algorithm: For each channel and associated T-slot in the frame, if at least one channel is present set B=1, copy the "bucket" (i.e., the posted packet or cell) and set C=1 for an appropriate channel; else (if no channels are present) set B=0.

Figures 19A, 19B:
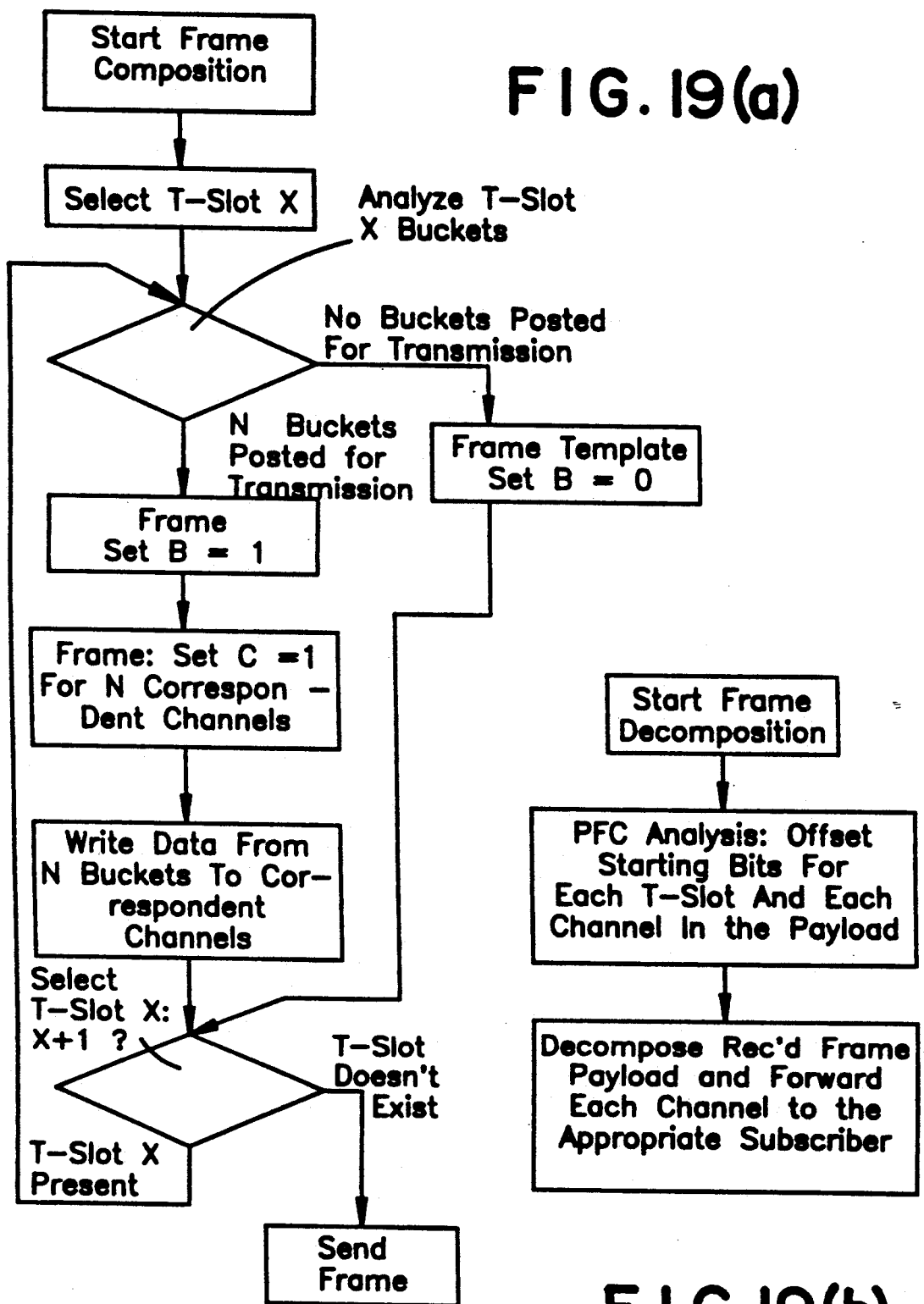
FIGS. 19(a) and (b) are flow charts illustrating the B and C bits set-up procedure for frame composition at the source node, and the PFC field and payload analysis for frame decomposition at the destination node.

This frame composition/decomposition is shown in greater detail in the flow charts of FIGS. 19(a) and 19(b). In FIG. 19(a), the source EFPS sets up the B and C bits depending on whether data is present for transmission, as part of the process of frame compression. At the start of frame composition, a first T-slot X is selected for analysis. If no buckets are posted for transmission in this T-slot, the presence bit B is set to equal 0 in the frame template. If, however, some buckets (say, N in number) are posted for transmission, the frame template is set up with B=1, and with C=1 for each of the N channels corresponding to the number of posted buckets. Data from the buckets is then written into the corresponding channels of the T-slot. If one of the buckets is empty, copying is unnecessary and the corresponding C bit is simply set to 0. Then (or in the case where B=0), the next T-slot (X+1) is selected for analysis and setup. If that T-slot is present, the same procedure is followed as with T-slot X; but if the T-slot is not present, the next T-slot is selected. The process continues until the last T-slot has been analyzed, and then the frame is sent. As emphasized earlier herein, assembly of the composite data frame requires that all of the data to be assembled into the frame must be destined for the same endpoint node.

It will be observed that two iterative processes are taking place during frame composition. First, for a T-slot go through each channel and copy each posted bucket in a corresponding channel, setting the appropriate C bit for each channel to 1 (or 0, as the case may be). Then go to the next T-slot, and if there is at least one channel present set the B bit to 1. The logic is the same regardless of the specific implementation.

The meaning of the "bucket" (or mailbox) may be further clarified as follows. At each VCP anchor (endpoint) node of the network a subscriber exists at one side of the switching fabric, and a trunk exists at the other side. Typically, in the system of the invention, the frame composition is performed on the trunk side as the traffic components cross the switching fabric. Every millisecond (or whatever other synchronous frame launch period may be used), the subscriber (through the SPU) posts a fixed size unit of data to be shipped across the network to a specified (addressed) destination. This procedure is performed at connection set-up time, in memory on the trunk side. During the next frame composition, the T-slot/channel template stored in memory is analyzed for each T-slot and the channels in that T-slot. For each of those channels a determination is then made of whether anything is posted for assembly into the composite data frame, by examining a portion of the memory in which the subscriber is to dump the data segments to be shipped. If something is to be sent, the SPU puts it into the preassigned location in memory and a flag is lifted, analogous to a mailbox flag, to indicate the presence of data to be shipped. In the preceding description, that location (and its contents) is termed a "bucket", and the bucket scheme is simply a mailbox scheme used by the subscriber to post the data which is to go into the next composite data frame.

The frame compression technique of the invention is independent of the traffic component type. If the subscriber has something to send, regardless of the traffic component type that "something" may be, a channel will be made available; and if there is nothing to send, the frame will be compressed accordingly, because there is no transmission of a blank channel.

Referring to FIG. 19(b), at the destination EFPS the presence bits are analyzed for purposes of the frame decomposition process. When a frame is received, the node initially examines the PFC field for the value of the B and C bits to interpret the payload structure for that incoming frame. The frame template stored at the node is used for offsetting the starting bit for each T-slot, and for each channel present in a T-slot in the payload of the frame. The frame payload is then decomposed by separating and forwarding each channel to the appropriate subscriber on the remote (destination) side. The separated channels traverse the switching fabric and travel to their respective destinations, which are mailboxes on the remote side of the subscriber connection.

The A bit is not examined during either decomposition or composition of the composite data frame. Only the B and C presence bits of the PFC field are used for the decomposition process. As has been described herein, the A bit stores information significant for a different process, that of flow control at the transit nodes, which will subsequently affect the composition process at the local EFPS side of the VCP anchor. At most, during decomposition of a frame the A bit may be observed and used to notify the subscribers that flow control is being exercised on their data. It then becomes the subscriber's responsibility to send less data.

Figure 20:
FIG. 20 is a simplified block diagram illustrating the retrieval and delivery of data from the received composite data frames by the destination node.
Figure 20:
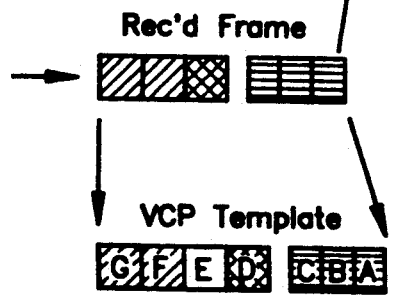
Figure 20:
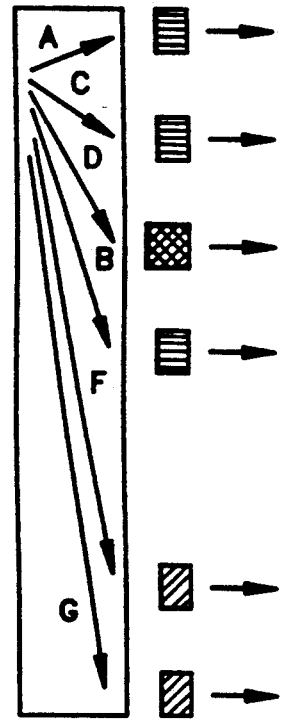

FIG. 20 illustrates the flow in retrieval and delivery of data by the destination EFPS, using the stored VCP template. Channels A, B and C are present for one T-slot, channel D for another T-slot, and channels F and G for the remaining T-slot of this exemplary frame. No channel E data is present, hence C=0 for that channel, and the remote EFPS recognizes that channel does not exist in the payload of the incoming frame. The header address and payload information for the several channels is then dispatched to the switch fabric where the information is directed to the appropriate subscribers.

Although a presently preferred embodiment and method of the invention have been disclosed herein, it will be apparent from a consideration of the foregoing disclosure by those skilled in the field to which the invention pertains, that variations and modifications of the described embodiment and method may be made without departing from the true spirit and scope of the invention. Accordingly, it is intended that the invention shall not be limited except as required by the appended claims and the rules and principles of the applicable law.

What is claimed is:

1. A method of transmitting information during call connections between a multiplicity of subscribers associated with different endpoint nodes as components of traffic in an integrated services network (ISN) for said endpoint nodes, in which the information traffic consists of a multiplicity of media types according to the different subscribers including voice, video and data traffic component types, said method comprising the steps of:

assembling a plurality of traffic component types in the form of portions of information streams to be transmitted from subscribers at an entry point node to said ISN during respective call connections into each of a sequence of composite frames of variable size for transmission through the ISN, limiting the traffic component types assembled into each of said composite frames to those destined for subscribers at the same exit point of the ISN, configuring each composite frame with the traffic component types assigned to respective separate groups of adjacent channels of predetermined bandwidth so that each group is limited to channels transporting traffic components of the same type, with each channel is a group dedicated to a particular subscriber of the respective traffic component type for the duration of its respective call connection, and reconfiguring at least some of said composite frames in the sequence to be launched into the ISM to modify said channel assignments during periods of traffic congestion in the ISN when necessary to accommodate priorities for traffic flow among the subscribers on a congested network path between said entry and exit points of the ISN.

2. The method of claim 1, wherein:

said channels of predetermined bandwidth in each composite frame are of much smaller size than the size of the overall payload containing the traffic component types in the composite frame.

3. The method of claim 1, wherein:

each of said channels in a group allocated to one of said traffic component types in each composite frame has the same fixed bandwidth as each of the other channels in that group.

4. The method of claim 3, wherein different ones of said traffic component types have different bandwidth requirements, and further including:

assigning priorities for traffic flow of the various traffic component types according to their respective need for bandwidth, for purposes of reconfiguring said composite frames.

5. The method of claim 4, further including:

allocating minimum guarantees and maximum allowabilities of bandwidth to different ones of said traffic component types according to their respective bandwidth requirements, and assigning priorities for traffic flow of the traffic component types as thresholds of their respective allocated minimum guaranteed bandwidth and maximum allowable bandwidth, for purposes of reconfiguring said composite frames.

6. The method of claim 4, further including:

allocating maximum utilization of network paths to different ones of said traffic component types according to their respective bandwidth requirements, and assigning priorities for traffic flow of the traffic component types as a function of their respective allocated maximum utilization of each particular network path, for purposes of reconfiguring said composite frames.

7. The method of claim 1, wherein:

said modifying of channel assignments for reconfiguring of frame is performed by limiting the amount of information transmitted by subscribers of lower priority for traffic flow on said congested network path than other subscribers at said entry point, so that less information need be assembled into said composite frames from lower priority subscribers and more channels are thereby made available to higher priority subscribers during assembly of composite frames while said network path remains congested.

8. The method of claim 1, wherein:

said modifying of channel assignments for reconfiguring of frames is performed by eliminating at least some of the information otherwise transmitted from subscribers of lower priority for traffic flow on said congested network path than other subscribers at said entry point, from at least some of the composite frames in the sequence whereby to make available additional channels to higher priority subscribers during assembly of composite frames while said network path remains congested.

9. A method of information communication during call connections between subscribers adapted to transmit and receive multimedia information at a pair of endpoint nodes of a fast packet switched network, said endpoint nodes being connected by a network path including at least one transit node traversed by links of said path, and wherein said multimedia information is conveyed as traffic consisting of a plurality of component types from among voice, video and data traffic component types each associated with a different subscriber at one of said pair of endpoint nodes, said method comprising:

launching a succession of composite frames conveying information from one of said pair of endpoint nodes to the other of said pair of endpoint nodes into said network on said network path with each of said frames configured to contain a plurality of fixed size channels representing bandwidth allocations for each of said traffic component types, each channel being assigned to a subscriber of the respective traffic component type at the endpoint node from which the composite frame was launched for the duration of that subscriber's respective call connection, and dynamically reconfiguring the composite frames prior to launching, by releasing and reassigning channels at said one of said pair of endpoint nodes when necessary to accommodate changes in traffic flow in the network.

10. The method of claim 9, further including:

guaranteeing a minimum bandwidth allocation for each of said traffic component types for transmission between said pair of endpoint nodes, and reconfiguring composite frames yet to be launched among said succession when one of the traffic component types using less than its minimum guaranteed bandwidth requires additional bandwidth while at least one of the other traffic component types is exceeding its minimum guaranteed bandwidth in composite frames previously launched among said succession.

11. The method of claim 9, further including:

initiating flow control of traffic at a transit node on said network path by means of control information associated with each composite frame when one of said links of said network path terminating on that node exceeds a predetermined link utilization threshold level indicative of traffic congestion, by which to assess the need for reconfiguration of the composite frames.

12. The method of claim 11, further including:

designating different priority levels for transmission on said network path among the different traffic component types, and reconfiguring the composite frames yet to be launched according to said priority designations when flow control is in effect at said transit node.

13. The method of claim 9, including:

initiating reconfiguration of the composite frames to be launched, in response to a need for additional bandwidth among at least one of the traffic component types at a time when such additional bandwidth is otherwise unavailable in composite frames transmitted on said network path, and communicating such need by issuing a reconfiguration request control frame to said one of said pair of endpoint nodes from another of the nodes along the network path.

14. The method of claim 13, further including:

storing at each of the nodes along said network path a representation of the then-current format of the composite frames traversing said network path and a separate representation of the extent of bandwidth change permitted for each traffic component type, for determining whether or not to grant a reconfiguration request contained in said control frame.

15. A system for information communication during call connections between subscribers adapted to transmit and receive multimedia information at a pair of endpoint nodes of a fast packet switched network, said endpoint nodes being connected by a network path including at least one transit node traversed by links of said path, and wherein said multimedia information is conveyed as traffic consisting of a plurality of component types from among voice, video and data traffic component types each associated with a different subscriber at one of said endpoint nodes, comprising:

means for launching a succession of composite frames into said network conveying information from one to the other of said pair of endpoint nodes on said network path, with each of said frames configured to contain a plurality of fixed size channels representing bandwidth allocations for each of said traffic component types, each channel being assigned to a subscriber of the respective traffic component type at the endpoint node from which the composite frame was launched for the duration of that subscriber's respective call connection and means responsive to a change in traffic flow on said network path requiring greater bandwidth for at least one of said traffic component types than before said change, for dynamically reconfiguring the composite frames by releasing and reassigning channels accordingly at said one of said pair of endpoint nodes.

16. The invention of claim 15, further including:

means for guaranteeing a minimum bandwidth allocation for each of said traffic component types, and wherein said reconfiguring means includes means for seeking reconfiguration of a composite frame before launch thereof from said one of said pair of endpoint nodes when one of the traffic component types using less than its minimum guaranteed bandwidth requires additional bandwidth while at least one of the other traffic component types is exceeding its minimum guaranteed bandwidth in a composite frame traversing said network path.

17. The invention of claim 15, further including:

means for initiating flow control of traffic at a transit node on said network path by appropriately modifying control information associated with each composite frame when one of said links traversing that transit node is carrying traffic that exceeds a predetermined link utilization threshold level indicative of traffic congestion, by which to assess the need for reconfiguration of the composite frames.

18. The invention of claim 17, further including:

means for designating different priority levels for transmission on said network among the different traffic component types, and wherein said reconfiguration means institutes reconfiguration of the composite frames according to said priority designations when flow control is in effect at a transit node.

19. The invention of claim 15, wherein said reconfiguring means is responsive to a need for additional bandwidth among at least one of the traffic component types at a time when such additional bandwidth is otherwise unavailable on said path, to initiate reconfiguration of the composite frames, and includes means for communicating such need by issuing a reconfiguration request control frame from one of said endpoint nodes to each of the other nodes along the network path for a decision on whether to grant or deny a change of the format of the composite frames according to the request.

20. The invention of claim 19, further including:

means for storing a representation of the then-current format of the composite frames and a separate representation of the bandwidth change permitted for each traffic component type, at each of the nodes along the network path, as a basis for the decision on said request.

* * * * *

UNITED STATES PATENT AND TRADEMARK OFFICE
CERTIFICATE OF CORRECTION

PATENT NO. : 5,282,202
DATED : January 25, 1994
INVENTOR(S) : Simon BERNSTEIN et al It is certified that error appears in the above-indentified patent and that said Letters Patent is hereby corrected as shown below:

TITLE PAGE:

In the abstract, column 2, sixth line from bottom "wa" should be --was--.

Column 40, claim 1, line 28, delete "point";
line 29, "to" should be --of--;
line 40, "is" should be --in--;
line 45, "ISM" should be --ISN--.

Signed and Sealed this

Twelfth Day of July, 1994

Attest:

BRUCE LEHMAN

Attesting Officer   Commissioner of Patents and Trademarks